(12) United States Patent
Nakamura et al.

(10) Patent No.: US 8,535,835 B2
(45) Date of Patent: Sep. 17, 2013

(54) FUEL BATTERY MODULE AND FUEL BATTERY DEVICE

(75) Inventors: Mitsuhiro Nakamura, Kirishima (JP); Takashi Ono, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 297 days.

(21) Appl. No.: 12/934,257

(22) PCT Filed: Mar. 24, 2009

(86) PCT No.: PCT/JP2009/055868
§ 371 (c)(1),
(2), (4) Date: Dec. 13, 2010

(87) PCT Pub. No.: WO2009/119615
PCT Pub. Date: Oct. 1, 2009

(65) Prior Publication Data
US 2011/0117457 A1  May 19, 2011

(30) Foreign Application Priority Data

| Mar. 26, 2008 | (JP) | 2008-080830 |
| Jun. 26, 2008 | (JP) | 2008-167409 |
| Jul. 29, 2008 | (JP) | 2008-194585 |
| Aug. 28, 2008 | (JP) | 2008-219253 |
| Aug. 28, 2008 | (JP) | 2008-219254 |
| Nov. 26, 2008 | (JP) | 2008-300726 |

(51) Int. Cl.
*H01M 8/06* (2006.01)

(52) U.S. Cl.
USPC ........... 429/408; 429/416; 429/423; 429/433; 429/455

(58) Field of Classification Search
USPC .......... 429/408, 416, 423–425, 466, 502, 429/506
See application file for complete search history.

(56) References Cited

U.S. PATENT DOCUMENTS
2010/0167154 A1* 7/2010 Ono .......................... 429/457

FOREIGN PATENT DOCUMENTS
| JP | 2007-059377 A | 3/2007 |
| JP | 2007-242626 A | 9/2007 |
| WO | 2007/013328 A1 | 2/2007 |
| WO | WO 2007/013328 A1 * | 2/2007 |

OTHER PUBLICATIONS

International Search Report dated Jul. 14, 2009 issued by the Japanese Patent Office for International Application No. PCT/JP2009/055868.
Supplementary European Search Report dated Jul. 13, 2012 issued by the European Patent Office for European Application No. EP 09 72 3668.
Search Opinion issued by European Patent Office for European Application No. EP 09 723 668.1.

* cited by examiner

*Primary Examiner* — Patrick Ryan
*Assistant Examiner* — Ben Lewis
(74) *Attorney, Agent, or Firm* — Procopio, Cory, Hargreaves & Savitch LLP

(57) ABSTRACT

A fuel cell module that can accommodate a single fuel cell stack efficiently and that can enhance power generation efficiency, and a fuel cell device comprising the fuel cell module.

26 Claims, 35 Drawing Sheets 1, 41, 50, 53, 55, 61, 68, 71, 81, 91, 101, 111, 131, 137, 141, 151, 161, 164, 171, 181

FUEL BATTERY MODULE AND FUEL BATTERY DEVICE

TECHNICAL FIELD

The present invention relates to a fuel cell module comprising fuel cells in a housing container as well as a fuel cell device comprising the fuel cell module.

BACKGROUND ART

In recent years, various kinds of fuel cell modules comprising fuel cells in a housing container that can generate power using hydrogen-containing gas and air (oxygen-containing gas) have been proposed as a next-generation energy source (for example, refer to Japanese Unexamined Patent Application Publication No. 2007-59377).

In addition, housing containers and the like in which an air chamber is provided above a power generating chamber for accommodating a cell stack and an air-introducing pipe is provided to introduce air to a space between the cell stacks from the air chamber have been proposed (for example, refer to Japanese Unexamined Patent Application Publication No. 2007-242626).

A conventional housing container described in Japanese Unexamined Patent Application Publication Nos. 2007-59377 and 2007-242626 can be a favorable housing container for accommodating a plurality of cell stacks in a power generating chamber, but if only one cell stack is accommodated inside the power generating chamber, since a reaction-gas introducing member and an air-introducing pipe are arranged in a hanging manner from above, wasted space is generated, and there is a problem that the fuel cell module becomes larger. Moreover, because reaction gas is supplied from one side of the cell stack, there is room for improvement in terms of power generating efficiency.

DISCLOSURE OF THE INVENTION

Therefore, the purpose of the present invention is to provide a fuel cell module that can accommodate a single fuel cell stack efficiently and that can enhance power generation efficiency, and a fuel cell device comprising the fuel cell module.

A fuel cell module according to the invention comprises: a housing container; a power generating chamber in the housing container; and a cell stack in the power generating chamber. The cell stack has a rectangular parallelepiped-shape and comprises a plurality of column-shaped fuel cells comprising one or more internal gas flow channels therein, and arranged in an upright state and electrically connected. Between a side portion of the fuel cells that constitute the cell stack along the arrangement direction of the fuel cells and an outer wall of the housing container facing the side portion, the housing container comprises: a first flow channel between the outer wall and a first wall located inside of the outer wall, for guiding operable to guide a reaction gas supplied from the lower side of the housing container flow to the upper side; a second flow channel between a second wall located inside the first wall and a third wall located inside the second wall, operable to guide the reaction gas that has passed through the first flow channel and flowed into the upper side flow to the lower side so as to be supplied to the power generating chamber; and a third flow channel between the first wall and the second wall operable to guide an exhaust gas in the power generating chamber flow from the upper side to the lower side, the third flow channel formed between the first wall and the second wall.

A fuel cell device according to the invention comprises: an exterior case; the above-mentioned fuel cell module in the exterior case; and an auxiliary device for operating the fuel cell module.

BRIEF DESCRIPTION OF THE DRAWINGS

The purpose, characteristics, and advantages of the present invention shall be made clear in the following detailed explanation and drawings.

FIG. 34 is a perspective view illustrating a fuel cell module according to an eleventh embodiment of the present invention.

BEST MODE FOR CARRYING OUT THE INVENTION

Preferred embodiments of the present embodiment are described in detail below with reference to the drawings.

First Embodiment

Figure 1:
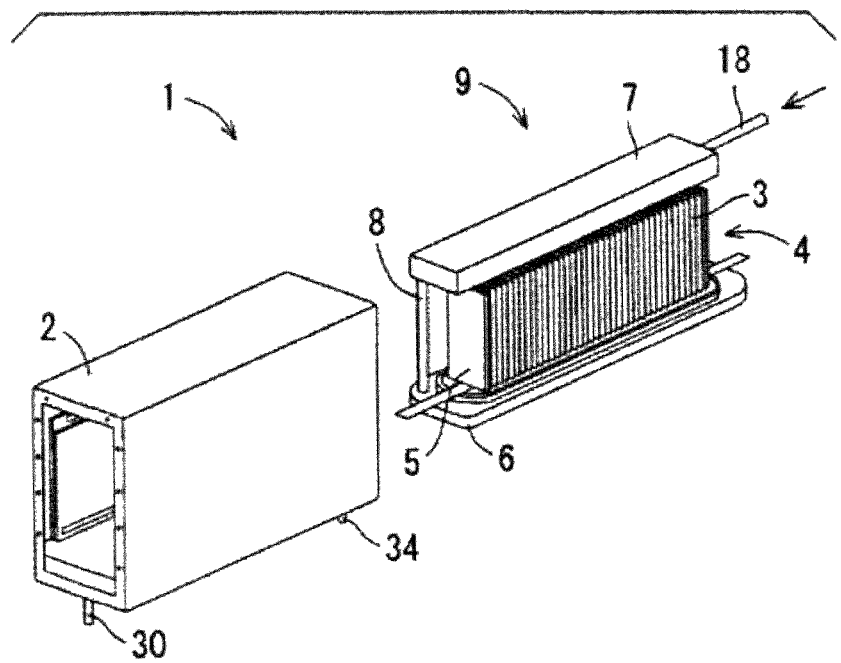
FIG. 1 is a perspective view illustrating a fuel cell module according to a first embodiment of the present invention.

FIG. 1 is a perspective view illustrating an outward appearance of a fuel cell module 1 of a first embodiment. The same numbers are given to identical members in the following drawings.

In the fuel cell module 1 shown in FIG. 1, the inside of a housing container 2 is constituted so that column-shaped fuel cells 3 having internal gas flow channels for gas to flow therein are arranged in an upright state, a cell stack 4 is constituted by being electrically and serially connected via a current-collecting member (not illustrated in FIG. 1) between adjacent fuel cells 3, conductive members 5 having a current-withdrawing part for collecting current generated by power generation of the cell stack 4 (fuel cell 3) and withdrawing the current outside are arranged on the side of both end portions of the cell stack 4, and a cell stack device 9 is composed by securing the lower end of each of the fuel cells 3 as well as the conductive members 5 onto a manifold 6 using an insulating adhesive (not illustrated) such as a glass sealer. FIG. 1 shows a case in which only one cell stack 4 is accommodated inside the housing container 2.

Furthermore, a reformer 7 generates fuel gas by reforming raw fuel such as natural gas or petroleum, and is arranged above the cell stack 4 (fuel cell 3) in order to obtain fuel gas to be used for power generation of the fuel cell 3 in FIG. 1. The fuel gas generated in the reformer 7 is supplied to the manifold 6 by a fuel-gas flowing pipe 8 and supplied to a gas flow channel provided inside the fuel cell 3 via the manifold 6. The constitution of the cell stack device 9 may be modified appropriately according to the type or shape of the fuel cell 3.

Furthermore, FIG. 1 shows a state in which a part of the housing container 2 (forward/rear face) has been removed and the cell stack device 9 to be accommodated therein has been removed to the back. Here, in the fuel cell module 1 shown in FIG. 1, the cell stack device 9 can be stored in the housing container 2 by sliding the cell stack device 9 into the housing container 2.

The constitution of the cell stack device 9 to be accommodated in the housing container 2 is now described.

Figure 2:
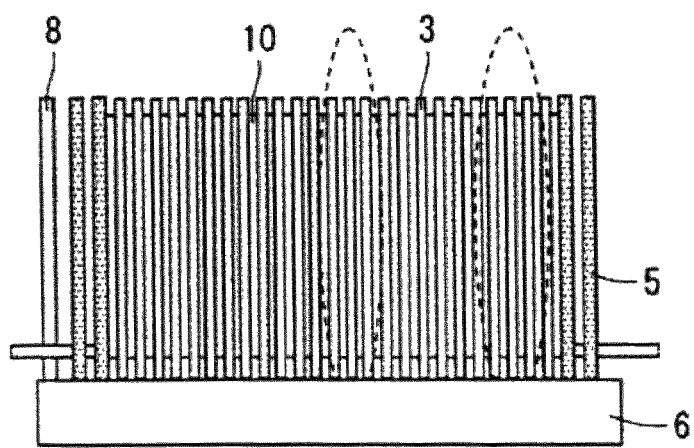
FIG. 2 is an exemplary schematic side view illustrating the cell stack device constituting the fuel cell module.
Figure 3:
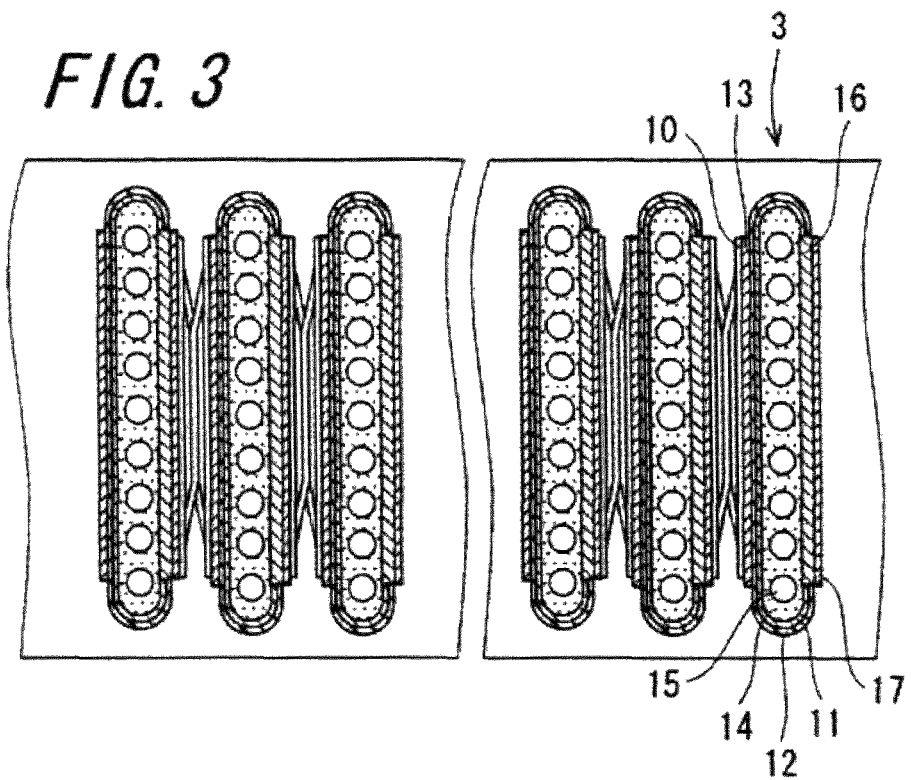
FIG. 3 is an enlarged plan view of a part of the cell stack device shown in FIG. 2.
Figure 4:
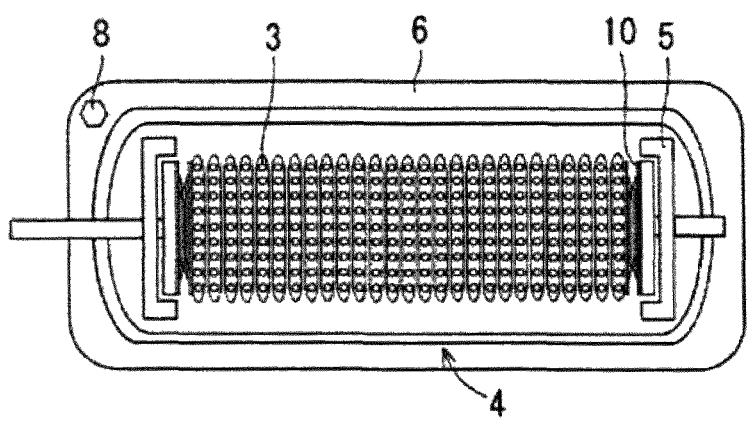
FIG. 4 is a plan view of the cell stack device shown in FIG. 2.

FIG. 2 is a schematic side view schematically illustrating the cell stack device 9, and FIG. 3 is a partially enlarged plan view of the cell stack device 9 shown in FIG. 2 in which the portion circled by a dotted line shown in FIG. 2 has been extracted and shown. Moreover, FIG. 4 is a plan view schematically illustrating the cell stack device 9 shown in FIG. 2 in which the current-collecting member 10 arranged between the fuel cells 3 is omitted from the illustration.

Here, in the cell stack device 9 excluding the reformer 7, the cell stack 4 is formed by electrically and serially connecting, while interposing the current-collecting member 10 between the adjacent fuel cells 3, a plurality of column-shaped fuel cells 3 composed by sequentially laminating a fuel-side electrode layer 11, a solid electrolyte layer 12, and an air-side electrode layer 13 on one flat surface of a column-shaped conductive support substrate 14 (hereinafter sometimes abbreviated as "support substrate 14") having a pair of opposing flat surfaces, and is formed by securing the lower end of the fuel cell 3 onto the manifold 6 for supplying fuel gas to the fuel cell 3. Conductive members 5 with lower ends secured onto the manifold 6 and a current-withdrawing part are arranged from both end portions in the arrangement direction of the fuel cell 3 so as to tightly pinch the cell stack 4 via the current-collecting member 10. The current-withdrawing part included in the conductive member 5 is provided in an extended form toward the outside along the arrangement direction of the fuel cell 3. Furthermore, FIG. 4 illustrates an exemplary cell stack 4 arranged on one manifold 6.

Moreover, an interconnector 16 is provided on the other flat surface of the fuel cell 3, and a gas flow channel 15 through which reaction gas flows to the fuel cell 3 is provided in the support substrate 14. FIG. 1 illustrates an exemplary cell stack device 9 in which fuel gas (gas containing hydrogen) is supplied from the manifold 6 into the gas flow channel 15.

Furthermore, a P-type semiconductor 17 may also be provided on the outer face (top face) of the interconnector 16. By connecting the current-collecting member 10 to the interconnector 16 via the P-type semiconductor 17, both contacts become ohmic contacts, thus making it possible to effectively avoid deterioration of the current-collecting performance and reducing drops in potential.

Furthermore, the support substrate 14 can serve as the fuel-side electrode layer 11 and the fuel cell 3 may also be constituted by sequentially laminating the solid electrolyte layer 12 and the air-side electrode layer 13 on the surface of the support substrate 14.

Various kinds of fuel cells are known for a fuel cell 3, but a solid oxide fuel cell can be used for the fuel cell 3 for reducing the size of the fuel cell device in which the fuel cell module 1 is accommodated. Therefore, the fuel cell device can be reduced in size and load following operations to follow the fluctuating load demanded in a fuel cell for a domestic use become possible. Furthermore, the fuel cell 3 can be manufactured by using commonly known materials and the like.

In the constitution described thus far, the cell stack device 9 in which a column of cell stack 4 is arranged on the manifold 6 is constituted. The fuel cell module 1 is constituted by accommodating the cell stack device 9 inside the housing container 2.

Figure 5:
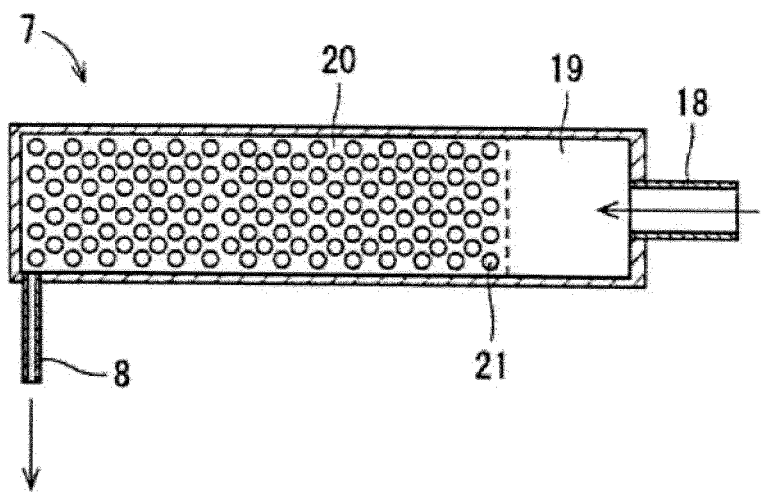
FIG. 5 is a cross-sectional view of a reformer shown in FIG. 1.

FIG. 5 is a cross-sectional view illustrating the reformer 7 shown in FIG. 1 and extracted therefrom. The reformer 7 is constituted by a vaporizing part 19 for vaporizing raw fuel or water and a reforming part 20 containing a reforming catalyst 21 for reforming raw fuel to fuel gas. A raw-fuel supply pipe 18 for supplying raw fuel is connected to the vaporizing part 19 and a water supply pipe can be separately provided when performing steam reforming in the reformer 7. Furthermore, the raw-fuel supply pipe 18 and a water supply pipe can constitute a dual pipe. Moreover, the vaporizing part 19 and the reforming part 20 are separated by a breathable wall.

Furthermore, a fuel-gas flowing pipe 8 for supplying the fuel gas generated in the reforming part 20 to the manifold 6 is connected to the end portion side of the reforming part 20 (reformer 7).

Figure 6:
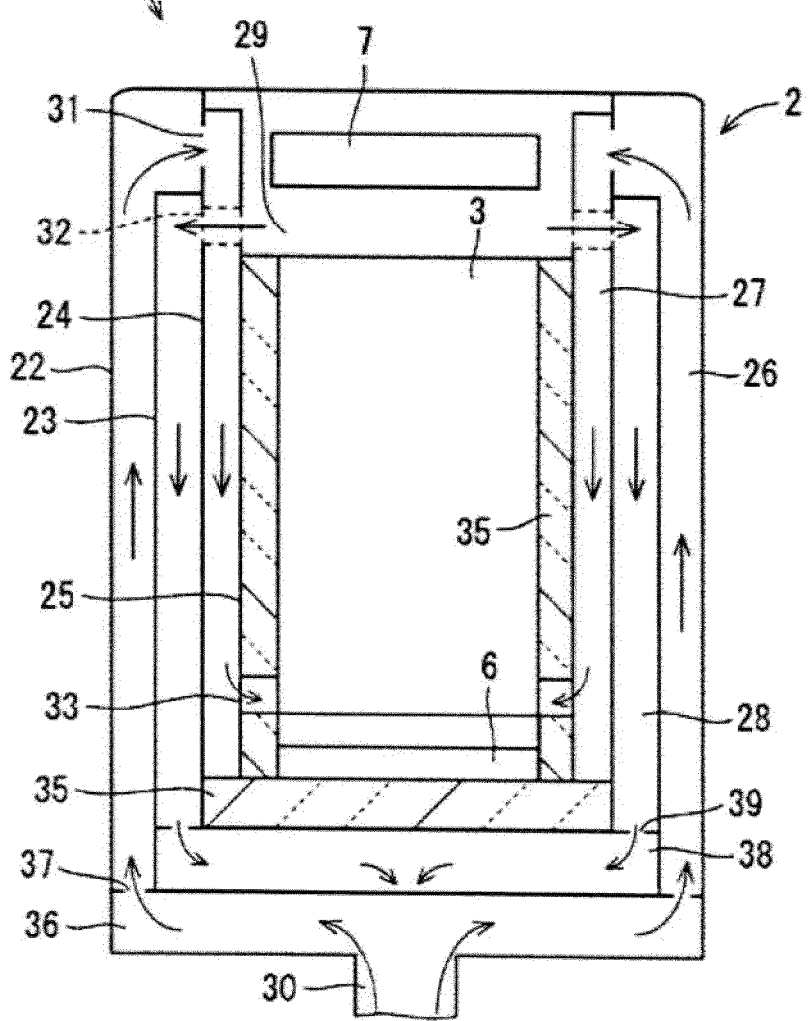
FIG. 6 is a cross-sectional view schematically illustrating the fuel cell module according to the first embodiment of the present invention.
Figure 7:
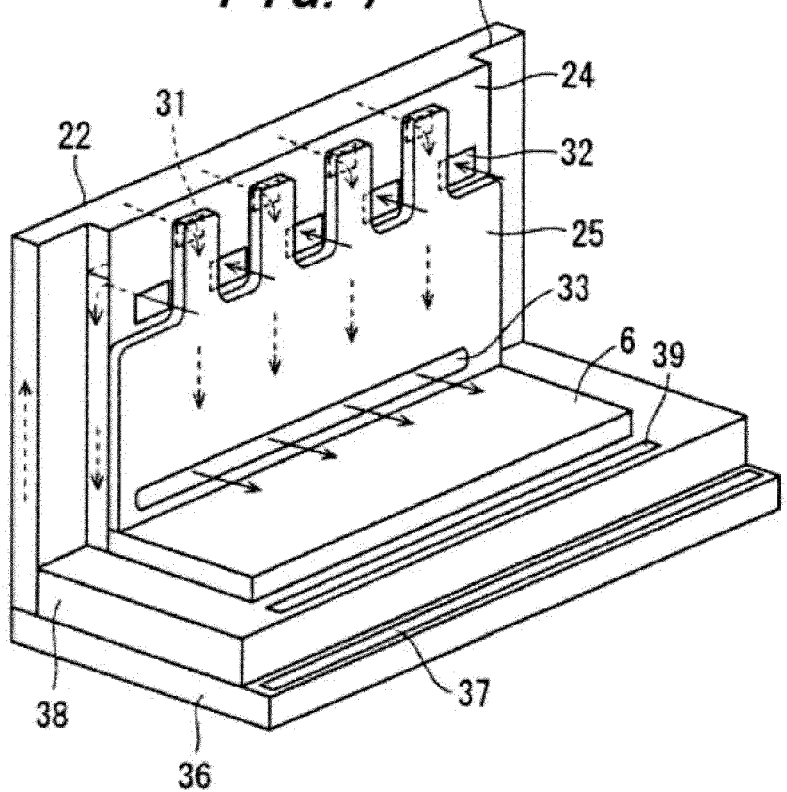
FIG. 7 is a perspective view illustrating a part of the sides near the side face and the bottom face of the housing container of the fuel cell module shown in FIG. 6.

FIG. 6 is a cross-sectional view schematically illustrating the fuel cell module 1 shown in FIG. 1, and FIG. 7 is an perspective view illustrating a part of the sides near the side face and the bottom face of the housing container 2 shown in FIG. 6 and extracted therefrom.

In the housing container 2, an outer frame of the housing container 2 is formed by an outer wall 22 and a power generating chamber 29 in which the fuel cell 3 (cell stack device 9) is accommodated.

This type of housing container 2 comprises flow channels through which reaction gas or exhaust gas flows between both side portions along the arrangement direction of the fuel cell 3 constituting the cell stack 4 and the outer wall 22 of the housing container 2 facing both side portions.

In the housing container 2, a first wall 23 is formed inside the outer wall 22 at a predetermined interval, a second wall 24 is arranged inside a first wall 23 at a predetermined interval, and a third wall 25 is arranged inside the second wall 24 at a predetermined interval.

As a result, the space formed by the outer wall 22 and the first wall 23 becomes a first flow channel 26, the space formed by the second wall 24 and the third wall 25 becomes a second flow channel 27, and the space formed by the first wall 23 and the second wall 24 becomes a third flow channel 28.

In the housing container 2 shown in FIG. 6, the upper end portion of the first wall 23 is connected to the second wall 24, the second wall 24 is connected to the top wall (outer wall 22) of the housing container 2, and the upper end portion of the third wall 25 is connected to the second wall 24 on the side closer to the top wall of the housing container 2 from the connection part of the first wall 23 and the second wall 24. The upper end portion of the third wall 25 can also be connected to the top wall of the housing container 2.

A reaction-gas supply pipe 30 for supplying reaction gas (air) into the housing container 2 is connected to the bottom part of the housing container 2, and reaction gas to be supplied from the reaction-gas supply pipe 30 flows to a reaction-gas introducing part 36. Since the reaction-gas introducing part 36 is connected to the first flow channel 26 via a reaction-gas introducing inlet 37, reaction gas flowing through the reaction-gas introducing part 36 flows into the first flow channel 26 via the reaction-gas introducing inlet 37. The reaction gas having flowed upward through the first flow channel 26 flows into the second flow channel 27 via a reaction-gas flow port 31 provided at the second flow channel 24. The reaction gas having flowed downward through the second flow channel 27 is supplied into the power generating chamber 29 via a reaction-gas supply port 33 provided on the third wall 25. An insulating material 35 is arranged on both side surface sides of the fuel cell 3 (cell stack 4) as well as the bottom face.

On the other hand, exhaust gas discharged from the fuel cell 3 or exhaust gas generated as a result of burning excess fuel gas on the side of the upper end portion of the fuel cell 3 flows into the third flow channel 28 via an exhaust-gas flow passage 32 provided on the second wall 24. The exhaust gas having flowed downward through the third flow channel 28 flows into an exhaust-gas collecting part 38 via an exhaust-gas collecting port 39 and is then discharged outside the housing container 2 via an exhaust-gas discharging pipe 34 (refer to FIG. 1) connected to the exhaust-gas collecting part 38.

Therefore, the reaction gas supplied from the reaction-gas supply pipe 30 is subjected to heat exchange with the exhaust gas that flows in the exhaust-gas collecting part 38 while flowing through the reaction-gas introducing part 36, then subjected to heat exchange with the exhaust gas that flows in the third flow channel 28 while flowing through the first flow channel 26, and then subjected to heat exchange with the exhaust gas that flows in the third flow channel 28 and with heat inside the power generating chamber 29 while flowing through the second flow channel 27.

As a result, the temperature of the reaction gas can be increased efficiently, thereby enhancing the power generating efficiency of the fuel cell 3.

In FIG. 7, a plurality of the reaction-gas flow ports 31 and a plurality of the exhaust-gas flow passages 32 are exemplarily illustrated. Accordingly, reaction gas flowing in the first flow channel 26 efficiently flows into the second flow channel 27 and is supplied into the power generating chamber 29. Exhaust gas inside the power generating chamber 29 efficiently flows through the third flow channel 28 and can be discharged outside the housing container 2.

The insulating material 35 (which is indicated as the shaded portion in the figure) arranged on both side surface sides of the cell stack 4 (fuel cell 3) is provided with a hole corresponding to the reaction-gas supply port 33 through which reaction gas flows toward the fuel cell 3 side.

The air supplied into the power generating chamber 29 from the reaction-gas supply port 33 flows from the lower end of the fuel cell 3 toward the upper end portion, thus allowing power generation of the fuel cell 3 to be conducted efficiently.

Insulating material 35 can be appropriately provided so that the power generation does not decrease as a result of temperature decreases of the fuel cell 3 (SC4) caused by extreme discharges of the heat in the housing container 2, and is provided at the bottom part of the manifold 6 as well as on the both side surface sides of the fuel cell 3 (cell stack 4) as shown in an example in FIG. 6.

In FIG. 6, a cell stack device 9 having a column of cell stack 4 is exemplarily accommodated inside the power generating chamber 29, and in this case, reaction gas is introduced from the both side surface sides of the fuel cell 3.

In addition, FIG. 6 exemplarily illustrates that the respective locations of the reaction-gas supply pipe 30 and the exhaust-gas discharging pipe 34 are off-set from each other, but the exhaust-gas discharging pipe 34 can be located inside the reaction-gas supply pipe 30.

Figure 8:
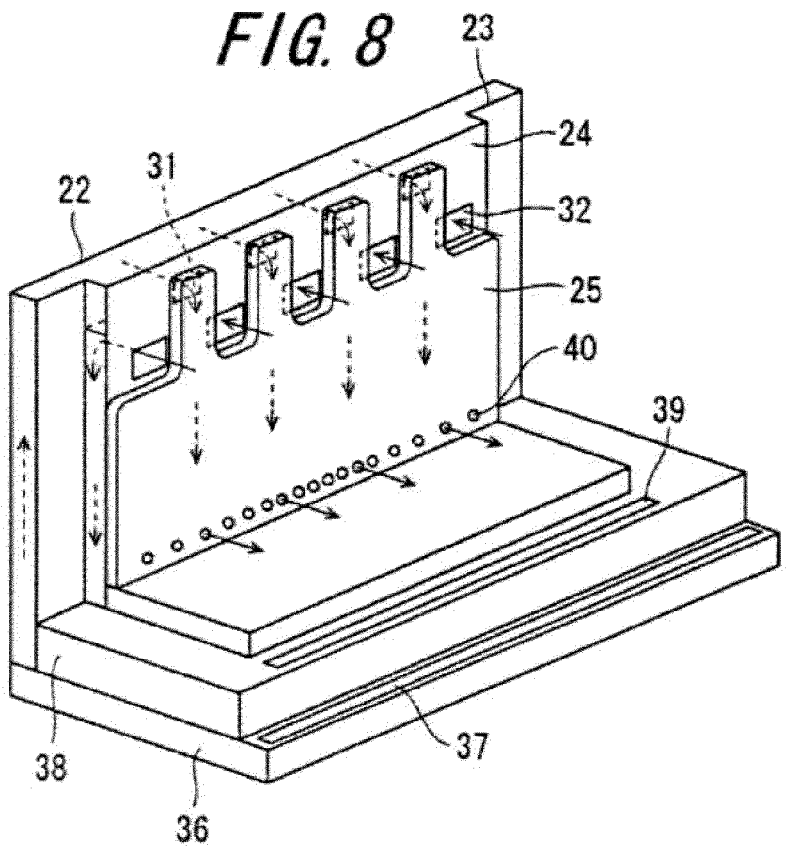
FIG. 8 is an exemplary perspective view illustrating the sides near the side face and the bottom face of the housing container of the fuel cell module shown in FIG. 6.

FIG. 8 is an exemplary view illustrating the side surface sides and the bottom surface side of the housing container 2 shown in and extracted from FIG. 6, and another example of a reaction-gas supply port provided on the third wall 25.

In FIG. 8, a plurality of reaction-gas supply ports 40 are provided for introducing reaction gas into the cell stack 4, and the reaction-gas supply ports 40 corresponding to the center portion side in the arrangement direction of the fuel cell 3 are provided with a particularly narrow interval and the reaction-gas supply ports 40 corresponding to the end portion side in the arrangement direction of the fuel cell 3 are provided with a wider interval. Accordingly, a large amount of gas is supplied to the center portion side of the cell stack 4, thereby discharging heat on the center portion side in the arrangement direction of the fuel cell 3 of the cell stack 4 in comparison to the end portion sides and making the temperature distribution in the arrangement direction of the fuel cell 3 of the cell stack 4 more uniform.

Second Embodiment

Figure 9:
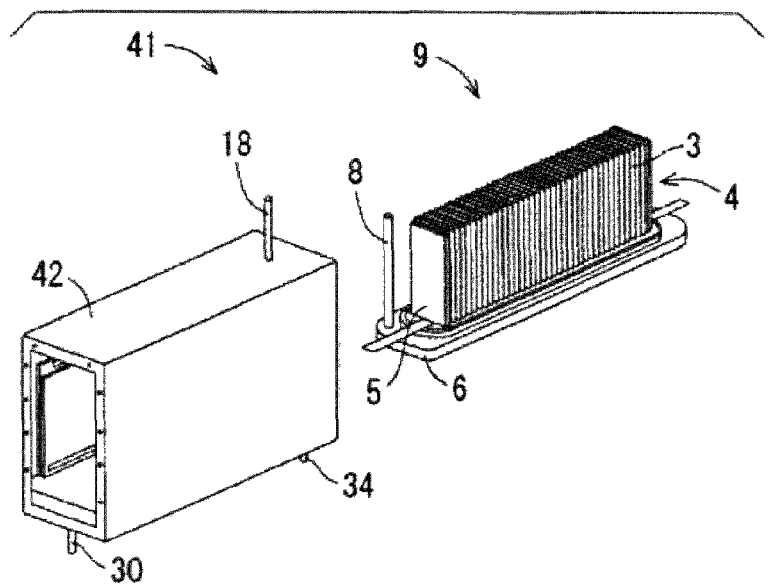
FIG. 9 is a schematic perspective view illustrating a fuel cell module according to a second embodiment of the present invention.

FIG. 9 is an schematic perspective view illustrating a fuel cell module 41 according to a second embodiment of the present invention in which the cell stack device 9 is accommodated in the housing container 42. In FIG. 9, the reformer 7 is connected to the inner face of the top wall of the housing container 42.

The fuel cell module 41 shown in FIG. 9 is illustrated such that part (front/rear face) of the housing container 42 is removed and the cell stack device 9 to be accommodated inside has been removed to the back.

Figure 10:
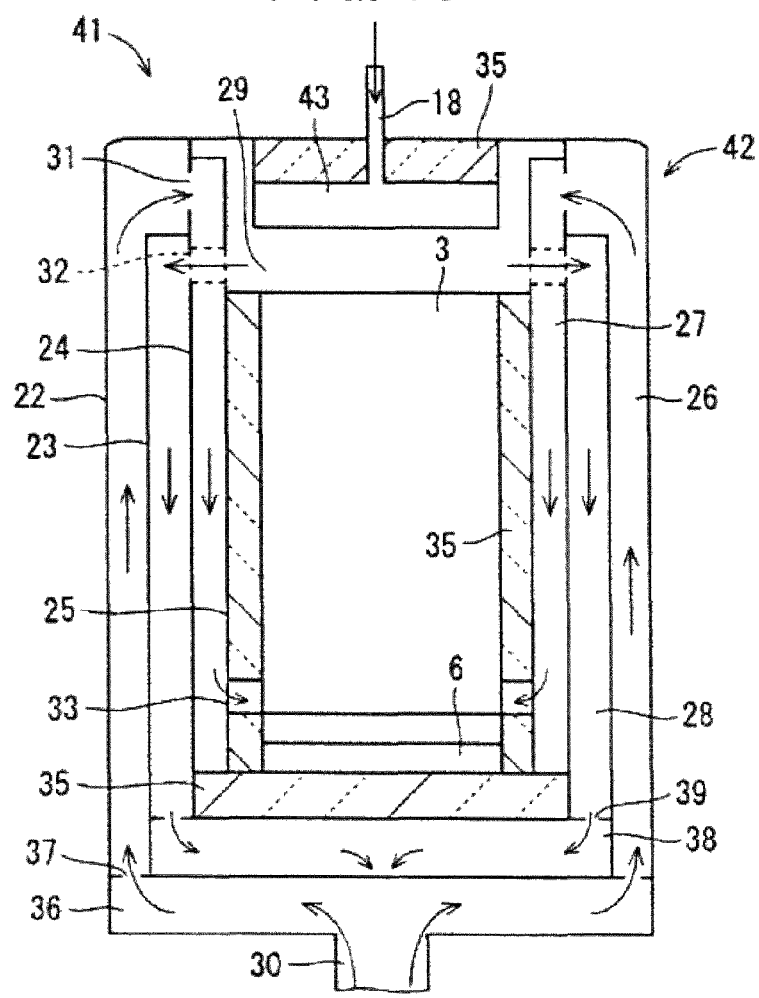
FIG. 10 is a cross-sectional view schematically illustrating the fuel cell module shown in FIG. 9.
Figure 11:
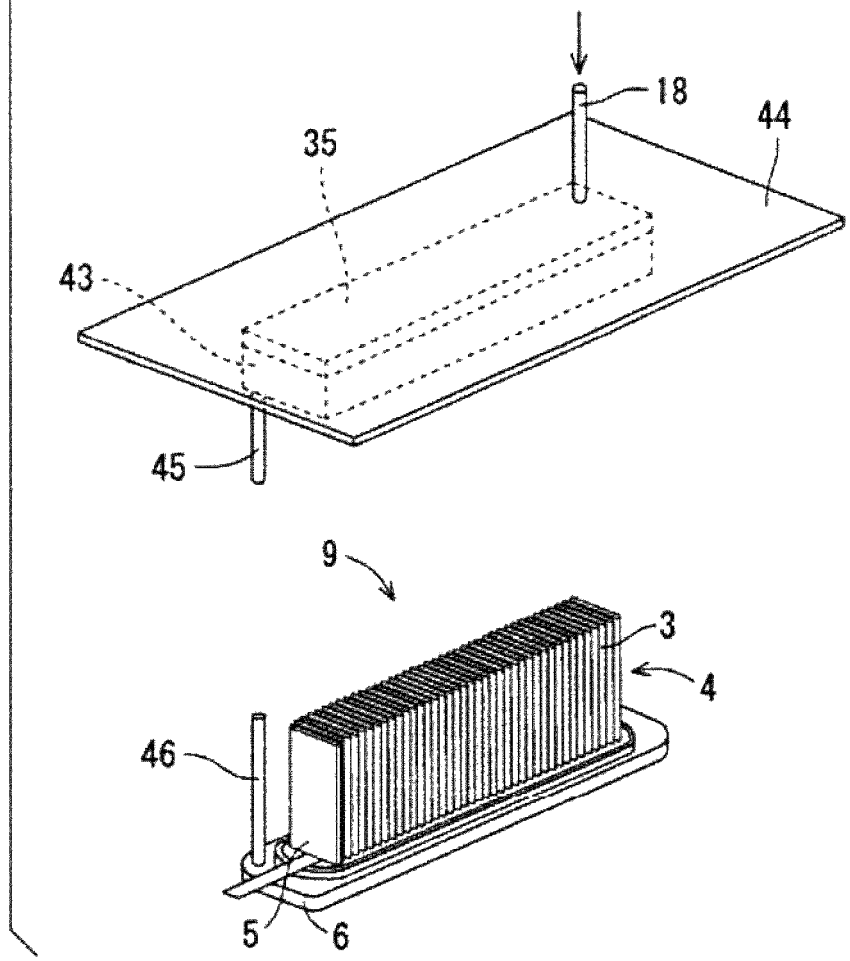
FIG. 11 is a perspective view illustrating a top wall of the housing container and the cell stack device of the fuel cell module shown in FIG. 9.

FIG. 10 is a cross-sectional view illustrating the fuel cell module 41 shown in FIG. 9 and is the same as the cross-sectional view illustrating the fuel cell module 1 shown in FIG. 6 except for the fact that a reformer 43 is connected to the inner face of the top wall of the housing container 42. FIG. 11 is a perspective view illustrating the cell stack device 9 and a top wall 44 of the housing container 42 to which the reformer 43 is connected, which are extracted from the fuel cell module 41 shown in FIG. 9.

In such a fuel cell module 41, the reformer 43 is arranged above the fuel cell 3 and also provided on the inner face side of the top wall 44 of the housing container 42. Specifically, the reformer 43 is connected to the inner face of the top wall 44 of the housing container 42 via the insulating material 35. In the following embodiments, if a reformer is provided on the inner face side of the top wall of a housing container, and similarly, the reformer is connected to the inner face of the top wall of the housing container via an insulating material.

Here, the fuel-gas flowing pipe 8 for supplying fuel gas generated in the reformer 43 to the manifold 6 is constituted of a reformer-side fuel-gas flowing pipe 45 connected to the reformer 43 and a manifold-side fuel-gas flowing pipe 46 connected to the manifold 6.

Here, because the reformer 43 is connected to the inner face of the top wall 44, it becomes easy to determine the position of the reformer 43 when assembling the fuel cell module 41 and the position of the cell stack device 9 can also be determined easily. As a result, assembly of the fuel cell module 41 becomes easy.

In such a fuel cell module 41, by removing the reformer-side fuel-gas flowing pipe 45 as well as the manifold-side fuel-gas flowing pipe 46 and also removing the top wall 44 from the housing container 42, the reformer 43 may easily be taken out from the housing container 42, and it is thus possible to easily attach and detach the reformer 43.

Since the reformer 43 may be easily attached and detached, when assembling the fuel cell module 41, the fuel cell module 41 may be easily assembled by sliding the cell stack device 9 into the housing container 42 to be accommodated before attaching the top wall 44, to which the reformer 43 has been connected, to the housing container 42.

When attaching the reformer-side fuel-gas flowing pipe 45 and the manifold-side fuel-gas flowing pipe 46, it is preferable to connect the reformer-side fuel-gas flowing pipe 45 to be inside the manifold-side fuel-gas flowing pipe 46 in order to prevent leakage of fuel gas supplied from the reformer 43.

Moreover, it is preferable to have a structure allowing for the reformer-side fuel-gas flowing pipe 45 and the manifold-side fuel-gas flowing pipe 46 to be easily attached and detached, and for example, a structure allowing for one-touch attachment and detachment is preferred.

By adopting such a structure, it becomes possible to easily arrange the reformer 43 above the fuel cell 3, and if excess fuel gas is burned in the upper end portion side of the fuel cell 3, the temperature of the reformer 43 may be efficiently increased, thereby making it possible to enhance the reforming efficiency of the reformer 43.

Figure 12:
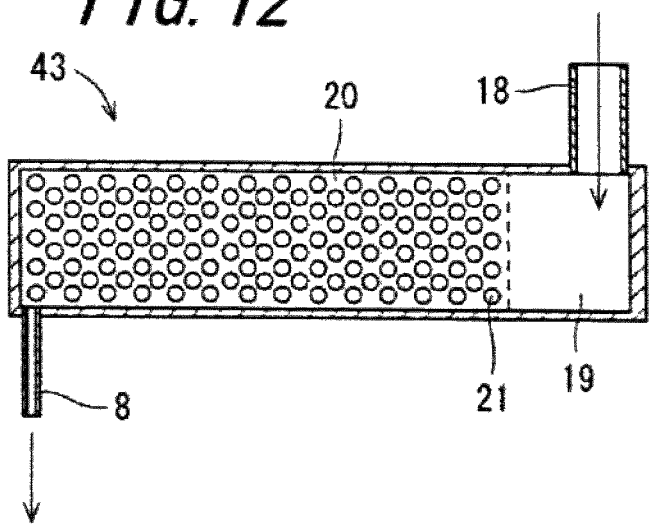
FIG. 12 is a cross-sectional view of a reformer shown in FIG. 9.

FIG. 12, which is extracted to show, is a cross-sectional view illustrating the reformer 43, to which the raw-fuel supply pipe 18 has been connected. In comparison to the reformer 7 shown in FIG. 5, this is different in that the raw-fuel supply pipe 18 is connected to the top face of the reformer 43.

Here, in a case of performing steam reforming with the reformer 43, it is possible to constitute a dual pipe with the raw-fuel supply pipe 18 and a water supply pipe. In this case, since water is supplied from the upper side of the reformer 43, there is a risk that the supplied water tends to stay on the bottom part of the vaporizing part 19. Therefore, the bottom part of the vaporizing part 19 may be an inclining face descending toward the reformer 20. As a result, the water supplied from a water supply pipe may be efficiently vaporized.

Third Embodiment

Figure 13:
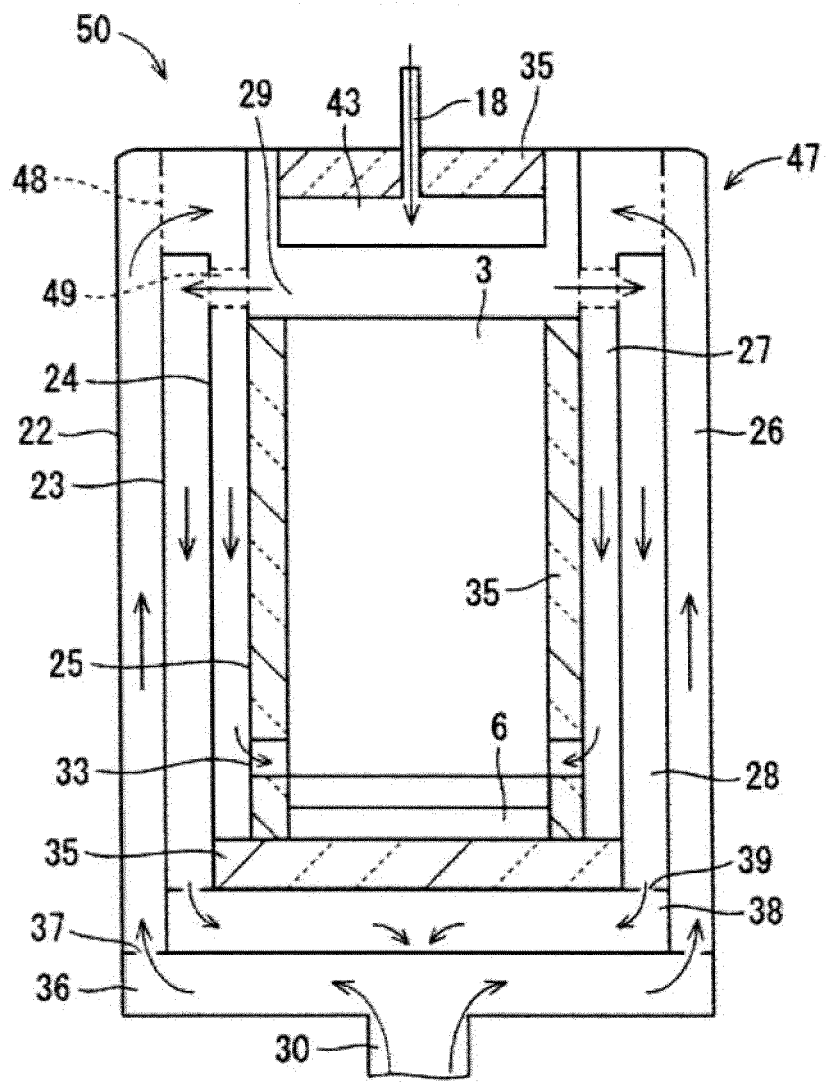
FIG. 13 is a cross-sectional view schematically illustrating a fuel cell module 50 according to a third embodiment of the present invention.
Figure 14:
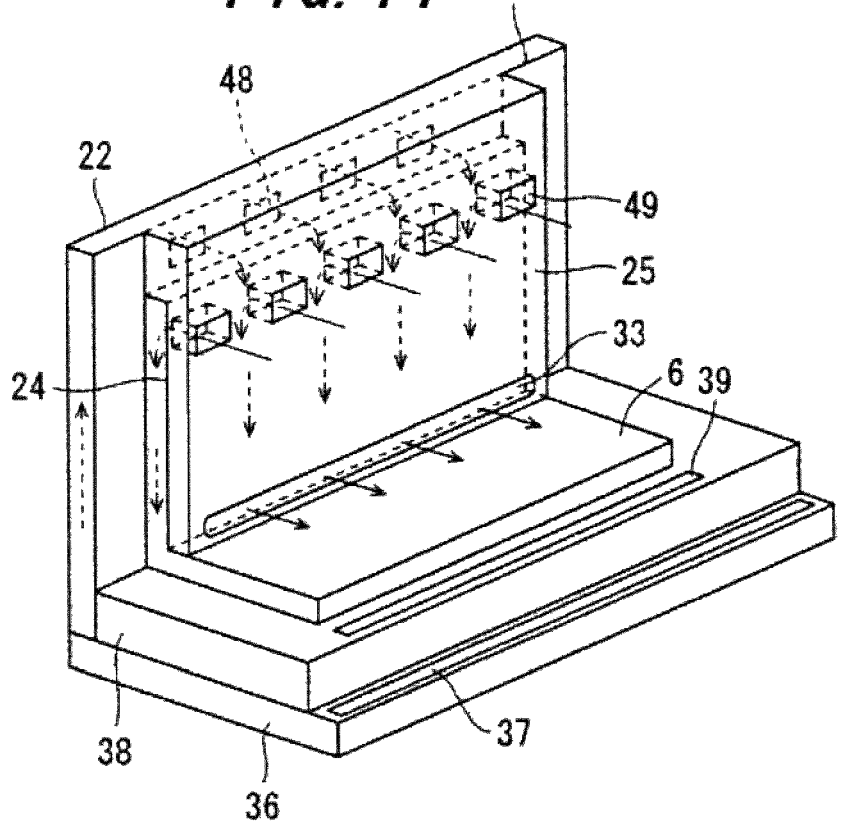
FIG. 14 is a perspective view illustrating a part of the sides near the side face and the bottom face of the housing container of the fuel cell module shown in FIG. 13.

FIG. 13 is a cross-sectional view schematically illustrating a fuel cell module 50 according to a third embodiment of the present invention, and FIG. 14 is an perspective view illustrating a part of the sides near the side face and the bottom face of the housing container 47 shown in and extracted from FIG. 13.

In the housing container 47 shown in FIG. 13, the upper end of the first wall 23 is connected to the top wall (outer wall 22) of the housing container 47 and a reaction-gas flow port 48 for connecting the first flow channel 26 and the second flow channel 27 is provided on the first wall 23. The upper end of the second wall 24 is connected on the lower side from the reaction-gas flow port 48 on the first wall 23. Furthermore, the upper end of the third wall 25 is connected to the top wall (outer wall 22) of the housing container 47, and an exhaust-gas flow passage 49 that connects the power generation chamber 29 and the third flow channel 28 is provided between the second wall 24 and the third wall 25. The third wall 25 may also be connected to the first wall 23 on the side near the top wall (upper side from the reaction-gas flow port 48) of the housing container 47 from the connection part of the first wall 23 and the second wall 24.

In such a housing container 47, reaction gas flowing into the first flow channel 26 from the reaction-gas introducing part 36 flows toward the upper side of the first flow channel 26 and then flows into the second flow channel 27 via a reaction-gas flow port 48 provided on the first wall 23. Reaction gas flowing toward the lower side in the second flow channel 27 is supplied into the power generating chamber 29 via the reaction-gas supply port 33 provided on the third wall 25.

On the other hand, exhaust gas discharged from the fuel cell 3 or exhaust gas generated as a result of burning excess fuel gas in the upper end portion side of the fuel cell 3 flows into the third flow channel 28 via an exhaust-gas flow passage 49 provided between the second wall 24 and the third wall 25. Exhaust gas flowing in the third flow channel 28 downward flows into the exhaust-gas collecting part 38 via the exhaust-gas collecting port 39 and is then discharged outside the housing container 2 via the exhaust-gas discharging pipe 34 (refer to FIG. 9) connected to the exhaust-gas collecting part 38.

Therefore, even in the housing container 47 comprising such a constitution, the reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing in the third flow channel 28 while flowing through the first flow channel 26, and is subjected to heat exchange with heat inside the power generating chamber 29 while flowing through the second flow channel 27.

As a result, the temperature of the reaction gas may be efficiently increased, thereby making it possible to enhance the power generating efficiency of the fuel cell 3.

FIG. 14 illustrates an example in which a plurality of the reaction-gas flow ports 48 and a plurality of the exhaust-gas flow passages 49 are provided. As a result, reaction gas flowing in the first flow channel 26 efficiently flows into the second flow channel 27 and is supplied into the power generating chamber 29. Furthermore, exhaust gas inside the power generating chamber 29 efficiently flows into the third flow channel 28 and can be discharged outside the housing container 2.

Furthermore, in a case in which the third wall 25 is connected to the top wall (outer wall 22) of the housing container 47, it is possible to control exhaust gas inside the power generating chamber 29 to remain in a space near the reformer 43, and the exhaust gas inside the power generating chamber 29 may be efficiently flowed into the third flow channel 28.

Fourth Embodiment

Figure 15:
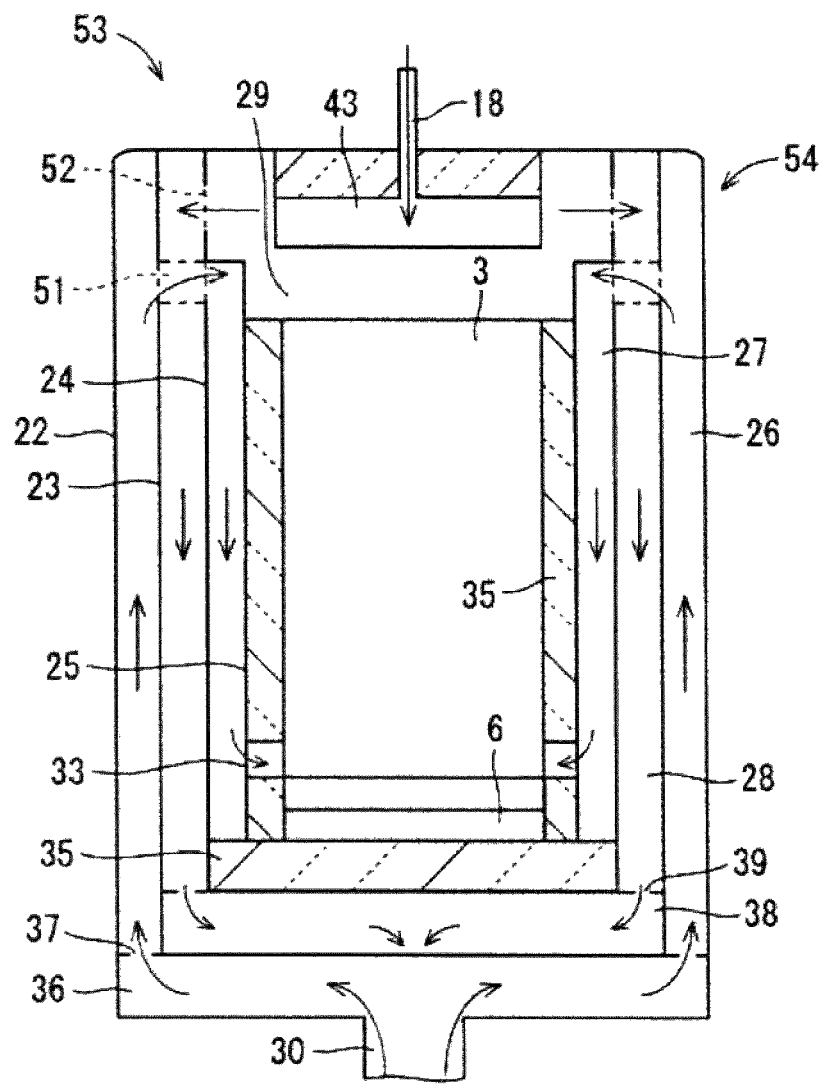
FIG. 15 is a cross-sectional view schematically illustrating a fuel cell module according to a fourth embodiment of the present invention.
Figure 16:
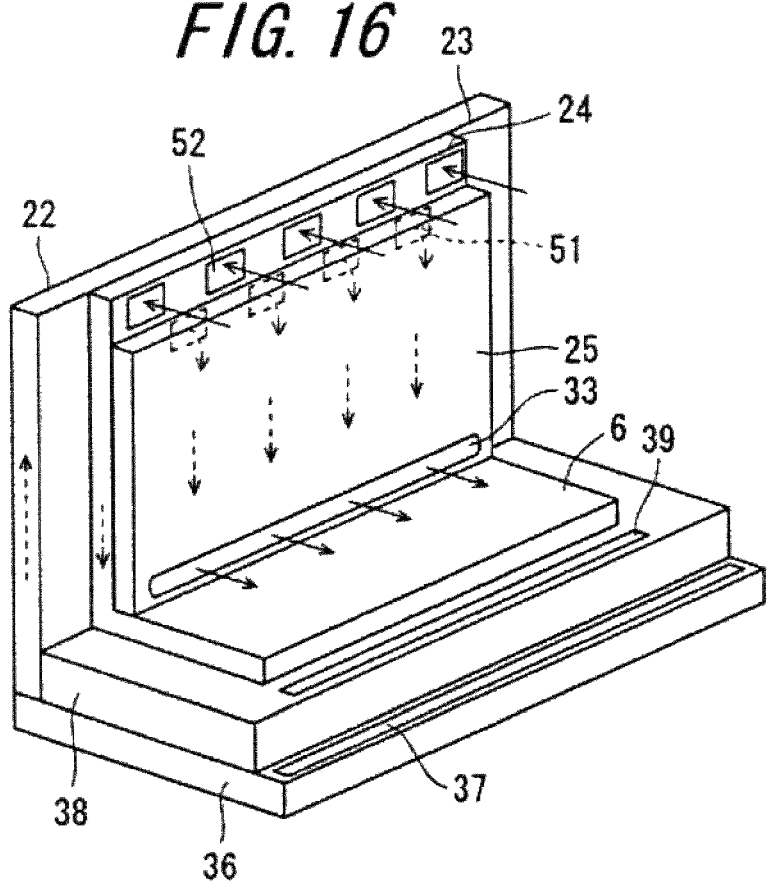
FIG. 16 is a perspective view illustrating a part of the sides near the side face and the bottom face of the housing container of the fuel cell module shown in FIG. 15.

FIG. 15 is a cross-sectional view schematically illustrating a fuel cell module 53 according to a fourth embodiment of the present invention, and FIG. 16 is an perspective view illustrating a part of the sides near the side face and the bottom face of the housing container 54 shown in and extracted from FIG. 15.

In the housing container 54 shown in FIG. 15, the upper end of the first wall 23 is connected to the top wall (outer wall 22) of the housing container 54. The upper end of the second wall 24 is connected to the top wall (outer wall 22) of the housing container 54. An exhaust-gas flow port 52 connecting the power generating chamber 29 and the third flow channel 28 is provided on the second wall 24. A reaction-gas flow passage 51 connecting the first flow channel 26 and the second flow channel 27 is provided between the first wall 23 and the second wall 24. The upper end of the third wall 25 is connected to the second wall 24 on the lower side of the exhaust-gas flow port 52 on the second wall at a position that is equal to or higher than the upper end of the reaction-gas flow passage 51. The upper end of the second wall 24 may also be connected to the first wall 23 on the side closer to the top wall of the housing container 2 from the reaction-gas flow passage 51.

In such a housing container 54, reaction gas flowing into the first flow channel 26 from the reaction-gas introducing part 36 flows toward the upper side of the first flow channel 26 and then flows into the second flow channel 27 via a reaction-gas flow passage 51 provided between the first wall 23 and the second wall 24. Reaction gas flowing toward the lower side in the second flow channel 27 is supplied into the power generating chamber 29 via the reaction-gas supply port 33 provided on the third wall 25.

On the other hand, exhaust gas discharged from the fuel cell 3 or exhaust gas generated as a result of burning excess fuel gas in the upper end portion side of the fuel cell 3 flows into the third flow channel 28 via an exhaust-gas flow port 52 provided on the third wall 25. Exhaust gas flowing in the third flow channel 28 flows downward into the exhaust-gas collecting part 38 via the exhaust-gas collecting port 39 and is then discharged outside the housing container 2 via the exhaust-gas discharging pipe 34 (refer to FIG. 9) connected to the exhaust-gas collecting part 38.

Therefore, even in the housing container 54 comprising such a constitution, reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing in the third flow channel 28 while flowing through the first flow channel 26, and is subjected to heat exchange with heat inside the power generating chamber 29 while flowing through the second flow channel 27.

As a result, the temperature of the reaction gas may be efficiently increased, thus making it possible to enhance the power generating efficiency of the fuel cell 3.

Moreover, FIG. 16 illustrates an example in which a plurality of the reaction-gas flow passages 51 and a plurality of the exhaust-gas flow ports 52 are provided. As a result, reaction gas flowing in the first flow channel 26 efficiently flows into the second flow channel 27 and is supplied into the power generating chamber 29. Exhaust gas inside the power generating chamber 29 efficiently flows into the third flow channel 28 and can be discharged outside the housing container 2.

The temperature of the upper part side inside the power generating chamber 29 increases due to the heat generated from power generation of the fuel cell 3 or by burning excess fuel gas in the upper end portion side of the fuel cell 3. Here, because the exhaust-gas flow port 52 provided on the third wall 25 is located on the upper part side of the power generating chamber 29, high-temperature exhaust gas may be caused to flow efficiently into the third flow channel.

As a result, efficient heat exchange with the exhaust gas flowing in the third flow channel and reaction gas becomes possible and the temperature of the reaction gas may be efficiently increased, thus making it possible to enhance the power generating efficiency of the fuel cell 3.

Figure 17:
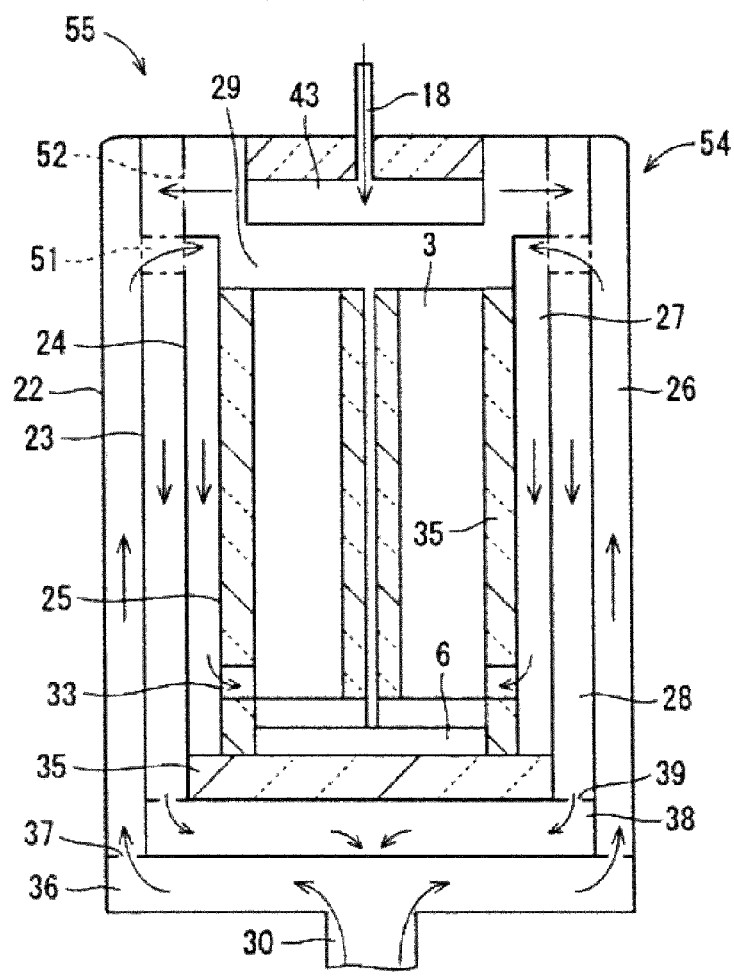
FIG. 17 is an exemplary cross-sectional view illustrating a fuel cell module according to a fourth embodiment of the present invention.

FIG. 17 is an exemplary cross-sectional view illustrating a fuel cell module 55 having two cell stacks 4 in a parallel manner inside the power generating chamber 29 of the housing container 54 shown in FIG. 15. The two cell stacks 4 are arranged on a single manifold 6.

In this case, since reaction gas is supplied to the side face on one side of each of the cell stacks 4 from the reaction-gas supply port 33, efficient power generation of the fuel cell 3 is possible even when two cell stacks are provided in a parallel manner.

An insulating material (a board or a cotton-like insulating material), for example, may be arranged on the side face on the other side of the cell stack 4 to allow the reaction gas supplied from the reaction-gas supply port 33 to flow efficiently between the fuel cells 3 that constitute the cell stack 4 from the side of the lower end portion to the side of the upper end portion while preventing the reaction gas supplied from the side face on one side of the cell stack 4 (reaction-gas flow port 33 side) from flowing out from the side face of the other side of the cell stacks 4. In this case, even if the reaction gas supplied from the reaction-gas supply port 33 flows in the direction of the side face on the other side of the cell stack 4, the reaction gas ends up flowing into the upper side along the insulating material, and the reaction gas can therefore flow efficiently between the fuel cells 3.

Fifth Embodiment

Figure 18:
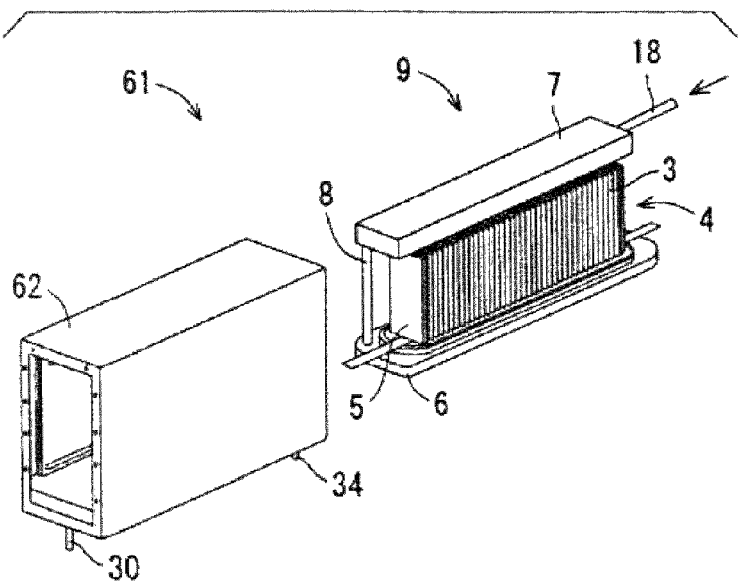
FIG. 18 is a perspective view illustrating a fuel cell module according to a fifth embodiment of the present invention.

FIG. 18 is an perspective view illustrating a fuel cell module 61 according to a fifth embodiment of the present invention in which the cell stack device 9 is accommodated in a housing container 62.

In the housing container 62 shown in FIG. 18, the reaction-gas supply pipe 30 for supplying oxygen-containing gas (normally air) that is supplied to the fuel cell 3 and the exhaust-gas discharging pipe 34 for discharging exhaust gas generated as a result of power generation, and the like of the fuel cell 3 to the outside of the housing container 62 are connected to the bottom face of the housing container 62. The reaction-gas supply pipe 30 and the exhaust-gas discharging pipe 34 may also be a dual pipe.

Figure 19:
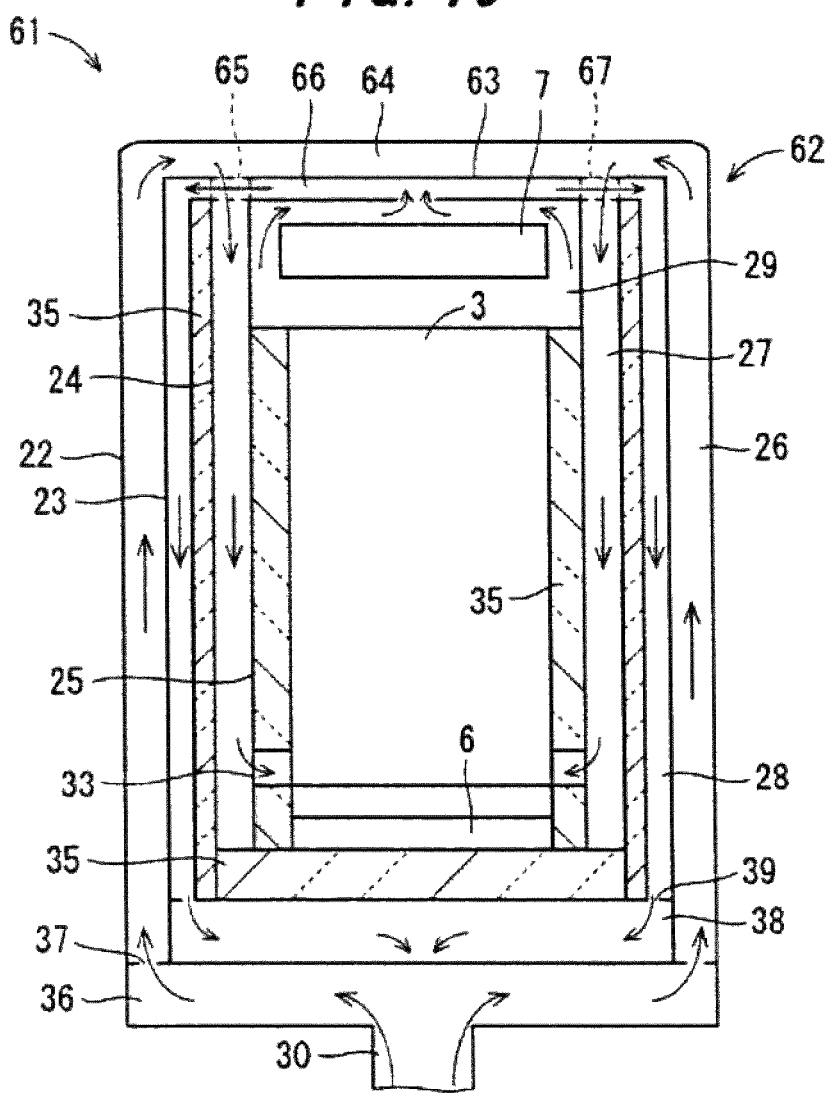
FIG. 19 is a cross-sectional view schematically illustrating a fuel cell module shown in FIG. 18.
Figure 20:
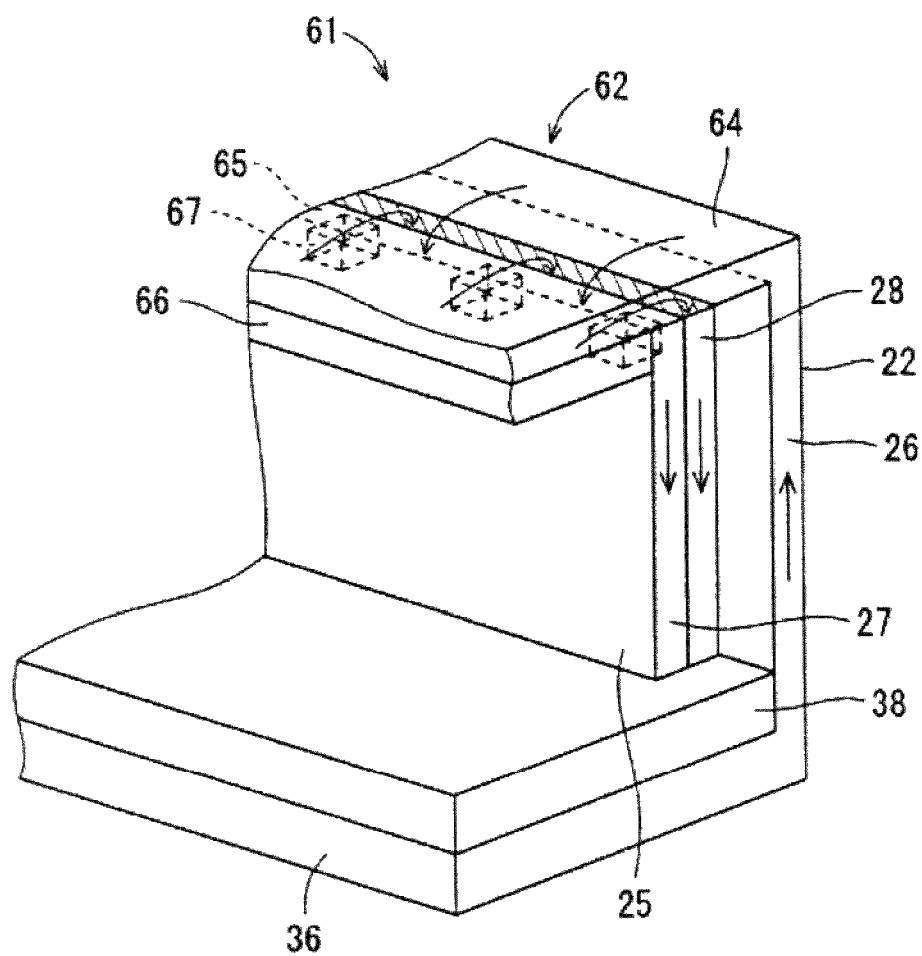
FIG. 20 is an exploded perspective view illustrating a part of the fuel cell module extracted and shown in FIG. 18.

FIG. 19 is a cross-sectional view schematically illustrating the fuel cell module 61 shown in FIG. 18, and FIG. 20 is an exploded perspective view illustrating a part of the fuel cell module 61 extracted to be shown.

In the housing container 62, a top wall 63 forming the power generating chamber 29 is arranged above the power generating chamber 29, and the space between the top wall 63 and the outer wall 22 (top wall of the housing container 62) becomes a fourth flow channel 64 through which reaction gas flowing in the first flow channel 26 flows into the second flow channel 27.

The reaction-gas supply pipe 30 for supplying reaction gas (air) into the housing container 2 is connected to the bottom part of the housing container 62, and reaction gas supplied from the reaction-gas supply pipe 30 flows into the reaction-gas introducing part 36. Since the reaction-gas introducing part 36 is connected to the first flow channel 26 via the reaction-gas introducing port 37, the reaction gas supplied into the reaction-gas introducing part 36 flows into the first flow channel 26 via the reaction-gas introducing port 37. The reaction gas flowing upward in the first flow channel 26 subsequently flows into a fourth flow channel 64 (described later) and flows into the second flow channel 27 via a second flow channel inlet 65. The reaction gas flowing through the second flow channel 27 from the upper side to the lower side is supplied into the power generating chamber 29 (fuel cell 3) via the reaction-gas supply port 33 provided on the third wall 25.

On the other side, exhaust gas discharged from the fuel cell 3 or exhaust gas generated as a result of burning excess fuel gas in the upper end portion side of the fuel cell 3 has a high temperature and is therefore preferably used specifically for the purpose of efficiently increasing the temperature of reaction gas flowing in the first flow channel 26.

The housing container 62 shown in FIG. 19 is characterized by comprising an exhaust-gas collecting chamber 66 above the power generating chamber 29 to collect and pass down the exhaust gas inside the power generating chamber 29 into the third flow channel 28.

Here, since the exhaust-gas collecting chamber 66 is provided on the upper side in the power generating chamber 29, in which the internal temperature becomes high, high-temperature exhaust gas is collected in the exhaust-gas collecting chamber 66. The exhaust gas flowing into the exhaust-gas collecting chamber 66 flows into the third flow channel 28 via an exhaust-gas flow passage 67 that penetrates the second flow channel 27. The exhaust gas flowing into the third flow channel 28 flows into the third flow channel 28 from the upper side toward the lower side, flows into the exhaust-gas collecting part 38 provided in the upper part of the reaction-gas introducing part 36 via the exhaust-gas collecting port 39, and is discharged outside the housing container 62 via the exhaust-gas discharging pipe 34 (refer to FIG. 18) connected to the exhaust-gas collecting part 38.

Therefore, the reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing downward in the third flow channel 28 while flowing through the first flow channel 26, and is subjected to heat exchange with the exhaust gas flowing downward in the third flow channel 28 and with heat inside the power generating chamber 29 while flowing downward through the second flow channel 27.

In particular, in the housing container 62, high-temperature exhaust gas can be passed down into the third flow channel 28 and efficient heat exchange with reaction gas supplied into the fuel cell 3 becomes possible by providing the exhaust-gas collecting chamber 66 above the power generating chamber 29, in which the internal temperature becomes high. As a result, the power generating efficiency of the fuel cell 3 may be enhanced.

Furthermore, constituting the housing container 62 in this way can make the fuel cell module 61 particularly useful if one cell stack 4 (cell stack device 9) is accommodated inside the power generating chamber 29.

The temperature of the reaction gas flowing into the second flow channel 27 after passing through the first flow channel 26 and the fourth flow channel 64 becomes high as a result of heat exchange with heat inside the power generating chamber 29 or heat of exhaust gases in the flowing process. The temperature of the exhaust gas flowing in the third flow channel 28 becomes low as a result of heat exchange with the reaction gas flowing in the first flow channel 26. Here, there is a risk of decreases in the temperature of the reaction gas when the heat of the reaction gas flowing in the second flow channel 27 is transferred to the exhaust gas flowing in the third flow channel 28.

Therefore, it is preferable to provide a heat-exchange suppression member in a space between the second flow channel 27 and the third flow channel 28 or in at least one of either the second flow channel 27 or the third flow channel 28 to suppress heat exchange between the reaction gas flowing in the second flow channel 27 and the exhaust gas flowing in the third flow channel 28. In FIG. 19, the insulating material 35 is arranged on the side near the second flow channel 27 in the third flow channel 28. As a result, heat exchange between the reaction gas flowing in the second flow channel 27 and the exhaust gas flowing in the third flow channel 28 may be suppressed, and decreases in the temperature of the reaction gas flowing in the second flow channel 27 may be suppressed. Decreases in the power generating efficiency of the fuel cell 3 may thereby be suppressed. The heat-exchange suppression member may be of any type as long as the member is capable of suppressing heat exchange between the reaction gas flowing in the second flow channel 27 and the exhaust gas flowing in the third flow channel 28, and examples include insulating material, concrete, and glass.

Figure 21:
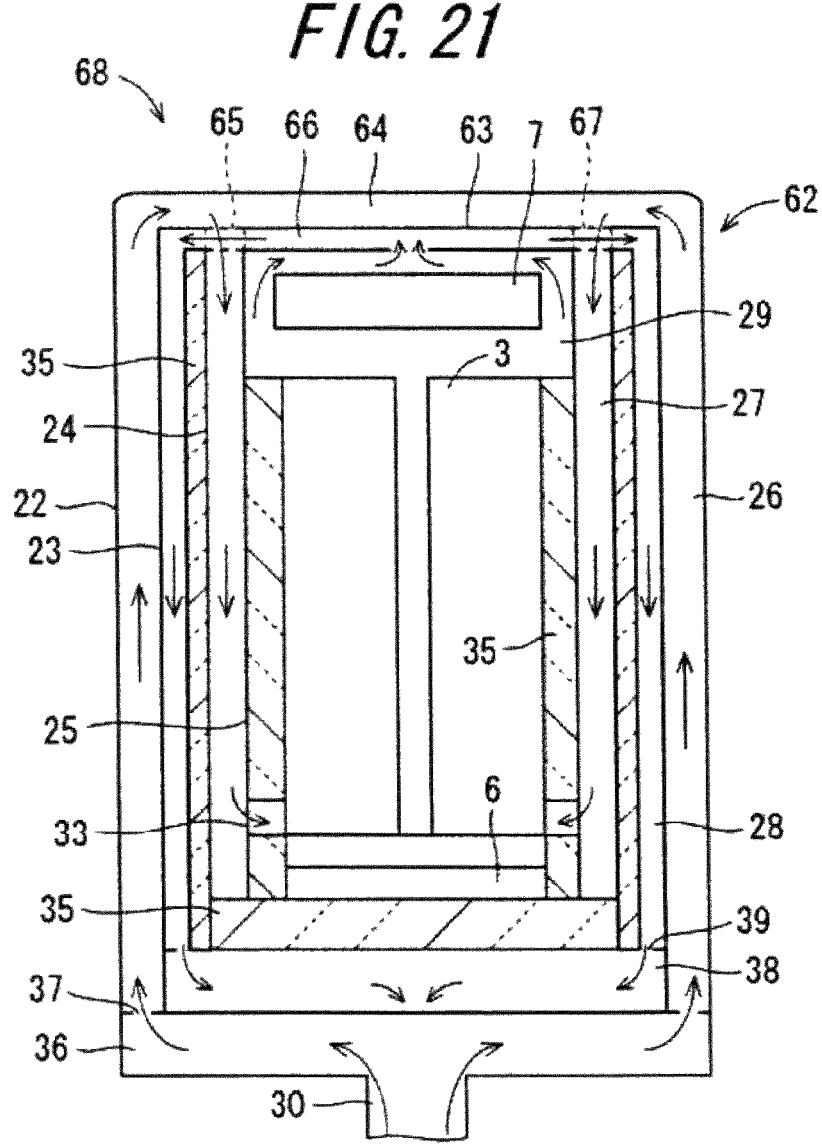
FIG. 21 is an exemplary cross-sectional view schematically illustrating a fuel cell module according to the fifth embodiment of the present invention.

FIG. 21 is a cross-sectional view illustrating an exemplary fuel cell module 68 having two cell stacks 4 in a parallel manner inside the power generating chamber 29 of the housing container 62 shown in FIG. 19. Two cell stacks 4 are arranged on a single manifold 6.

In this case, since reaction gas is supplied to the side face on one side of each of the cell stacks 4 from the reaction-gas supply port 33, efficient power generation of the fuel cell 3 is possible even if two cell stacks are provided in a parallel manner.

An insulating material (a board or a cotton-like insulating material), for example, may be arranged on the side face on the other side of the cell stack 4 to allow the reaction gas supplied from the reaction-gas supply port 33 to flow efficiently between the fuel cells 3 that constitute the cell stack 4 from the side of the lower end portion to the side of the upper end portion while preventing the reaction gas supplied from the side face on one side of the cell stack 4 (reaction-gas flow port 33 side) from flowing out between the cell stacks 4 from the side face on the other side of the cell stack 4. In this case, even if the reaction gas supplied from the reaction-gas supply port 33 flows in the direction of the side face on the other side of the cell stack 4, the reaction gas ends up flowing into the upper side along the insulating material, and the reaction gas can therefore flow efficiently between the fuel cells 3.

Sixth Embodiment

Figure 22:
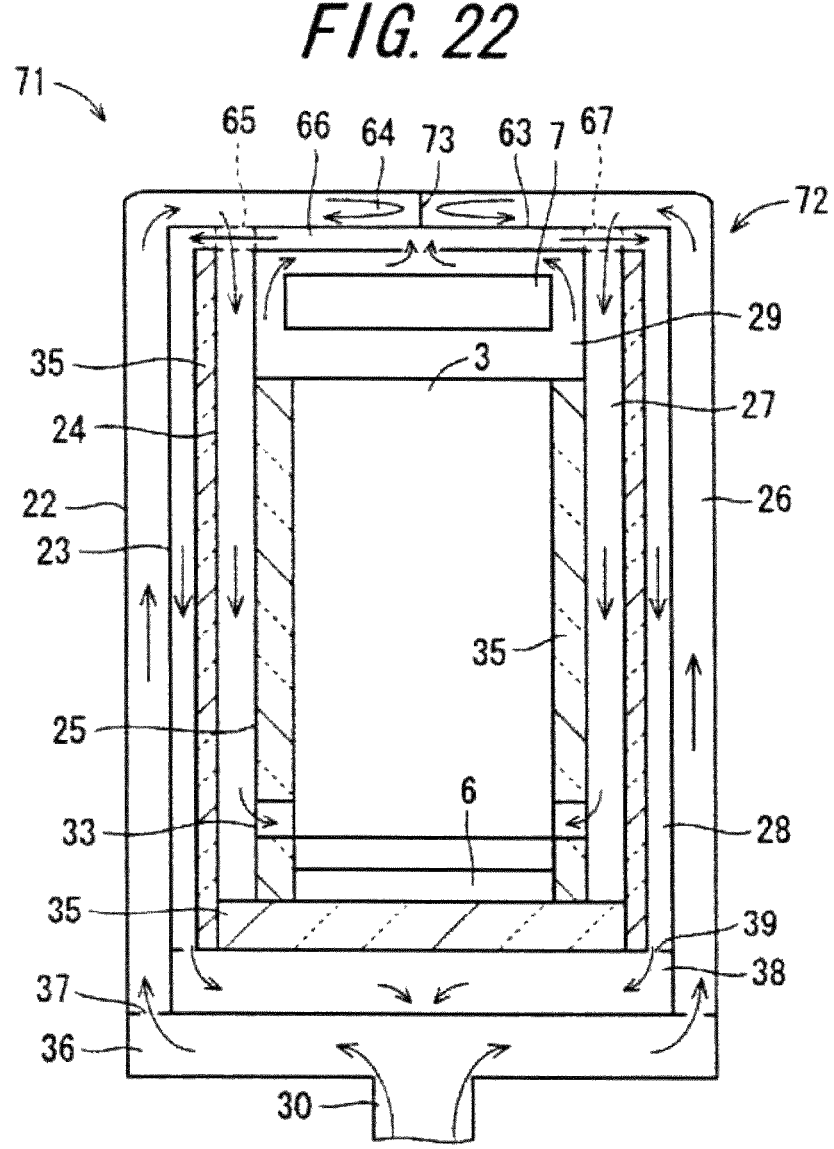
FIG. 22 is a cross-sectional view schematically illustrating a fuel cell module according to a sixth embodiment of the present invention.

FIG. 22 is a cross-sectional view illustrating a fuel cell module 71 according to a sixth embodiment of the present invention. In the fuel cell module 71 shown in FIG. 22, a partitioning member 73 is provided within the fourth flow channel 64 in the housing container 72.

As shown in the housing container 62 shown in FIG. 19, if the second flow channel 27 (a second flow channel inlet 65) is arranged on the side near the side wall (outer wall 22), part of the reaction gas flowing through the first flow channel 26 located on one side along the arrangement direction of the fuel cell 3 (hereinafter sometimes abbreviated as "one side") and flowing into the fourth flow channel 64 on one side sometimes flows in the direction perpendicular to the arrangement direction of the fuel cell 3 without flowing into the second flow channel inlet 65 on one side.

In this case, the reaction gas flowing through the fourth flow channel 64 in the direction perpendicular to the arrangement direction of the fuel cell 3 remains within the fourth flow channel 64 due to the effects of the reaction gas flowing in the direction perpendicular to the arrangement direction of the fuel cell 3 after flowing through the first flow channel 26 located on the other side along the arrangement direction of the fuel cell 3 (hereinafter sometimes abbreviated as "the other side") and the effects of the reaction gas flowing into the second flow channel 27 via the fourth flow channel 64, and therefore, there is a risk that the output of the power generation of the fuel cell 3 may become low. Furthermore, in this case, there is also a risk that the temperature of the top wall (outer wall 22) of the housing container 62 becomes high.

Moreover, when a large amount of reaction gas flowing into the fourth flow channel 64 flows into one side or the other side of the second flow channel 27 and the amount of reaction gas supplied from both side surface sides of the fuel cell 3 becomes uneven, there is also a risk of adverse effects such as wearing in addition to deterioration of the power generating efficiency of the fuel cell 3.

Therefore, in the fuel cell module 71 shown in FIG. 22, a partitioning member 73 is provided in the fourth flow channel 64 in the housing container 72 so that the reaction gas flowing through one side of the first flow channel 26 flows into the one side of the second flow channel 27 and the reaction gas flowing through the other side of the first flow channel 26 flows into the other side of the second flow channel 27.

As a result, it becomes possible to suppress the amount of the reaction gas flowing through the first flow channel 26 and flowing into the fourth flow channel 64 remaining in the fourth flow channel 64 and to suppress deteriorations in the power generating efficiency of the FC 3. In addition, it is possible to suppress excessive increases in the temperature of the top wall (outer wall 22) of the housing container 72.

Moreover, by providing the partitioning member 73 in the fourth flow channel 64, the reaction gas flowing through one side of the first flow channel 26 flows in one side of the second flow channel 27 and is supplied from the side face on one side of the fuel cell 3, and the reaction gas flowing through the other side of the first flow channel 26 flows in the other side of the second flow channel 27 and is supplied from the side face on the other side of the fuel cell 3. As a result, unevenness in the amount of reaction gas supplied from both side faces of the fuel cell 3 may be suppressed, and it is also possible to suppress decreases in the output of power generation of the fuel cell 3 and adverse effects such as wearing.

Furthermore, the temperature of the upper side in the power generating chamber 29 becomes particularly high due to the heat generated by the power generation of the fuel cell 3 or due to combustion heat when burning excess fuel gas that was not used for power generation in the upper end side of the fuel cell 3. Therefore, efficient heat exchange of the reaction gas to be supplied to the fuel cell 3 with air (exhaust gas) above the power generating chamber 29 allows for reaction gas to be supplied at a higher temperature to the fuel cell 3, thus making it possible to enhance the power generating efficiency of the fuel cell module 71 (fuel cell 3).

Seventh Embodiment

Figure 23:
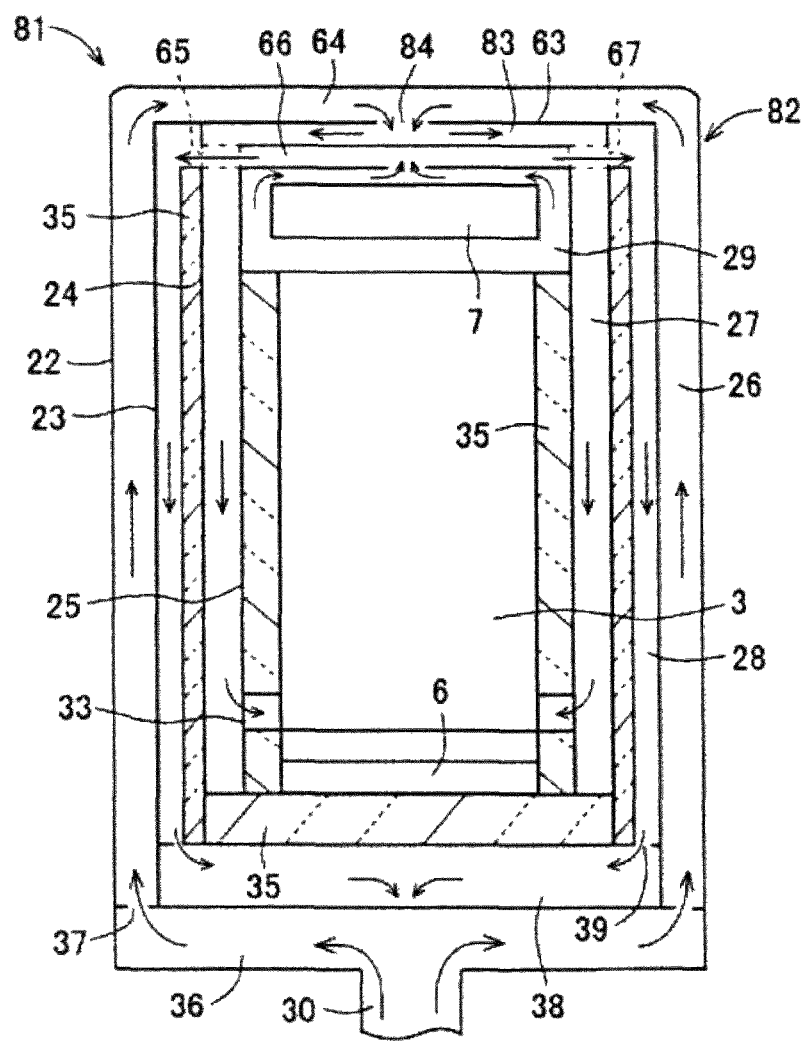
FIG. 23 is a cross-sectional view schematically illustrating a fuel cell module according to a seventh embodiment of the present invention.

FIG. 23 is a cross-sectional view illustrating a fuel cell module 81 of according to a seventh embodiment of the present invention, and the fuel cell module 81 in FIG. 23 is an example comprising a fifth flow channel 83 between the fourth flow channel 64 and the second flow channel 27 in a housing container 82, through which reaction gas flows into the second flow channel 27 after flowing through the fourth flow channel 64 and being collected above the exhaust-gas collecting chamber 66. In FIG. 23, the fifth flow channel 83 is arranged so as to face the exhaust-gas collecting chamber 66.

In this type of fuel cell module 81, the reaction gas flowing through one side of the first flow channel 26 toward the upper side flows through the fourth flow channel 64 along the top wall of the housing container 82 in the direction perpendicular to the arrangement direction of the fuel cell 3, and flows into the fifth flow channel 83 via a fifth flow channel inlet 84. It is preferable to provide the fifth flow channel inlet 84 in the center part in the direction perpendicular to the arrangement direction of the fuel cell 3 within the fourth flow channel 64 so that the reaction gas flowing through one side of the first flow channel 26 and the reaction gas flowing through the other side of the first flow channel 26 may be efficiently collected.

The reaction gas flowing into the fifth flow channel 83 via the fifth flow channel inlet 84 is efficiently subjected to heat exchange with high-temperature exhaust gas flowing in the exhaust-gas collecting chamber 66 while flowing through the fifth flow channel 83 that is arranged so as to face the exhaust-gas collecting chamber 66. Since the heated reaction gas is supplied to the fuel cell 3 after flowing through the second flow channel 27 connected to the fifth flow channel 83, reaction gas with a higher temperature may be supplied to the fuel cell 3, thus making it possible to enhance the power generating efficiency of the fuel cell 3.

Eighth Embodiment

Figure 24:
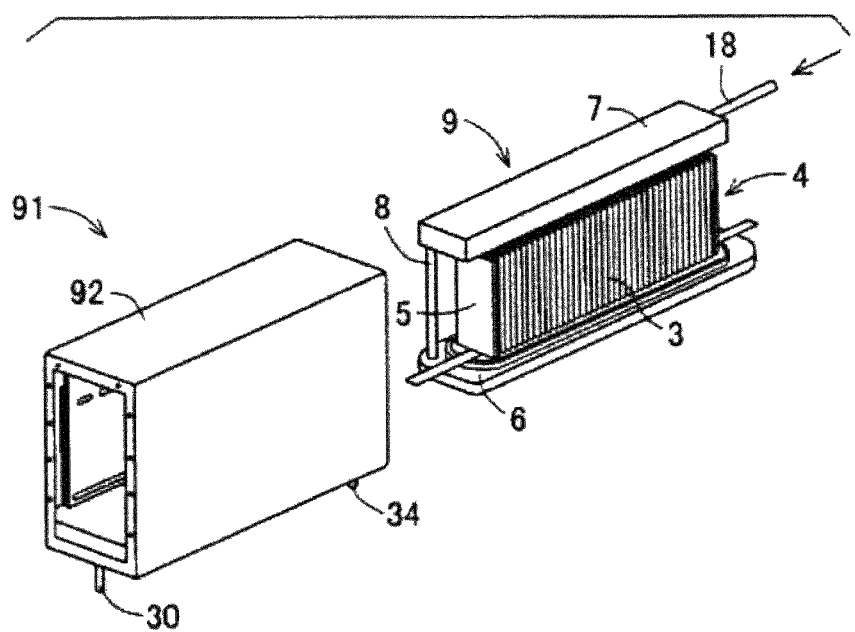
FIG. 24 is a perspective view illustrating an outside of a fuel cell module according to an eighth embodiment of the present invention.
Figure 25:
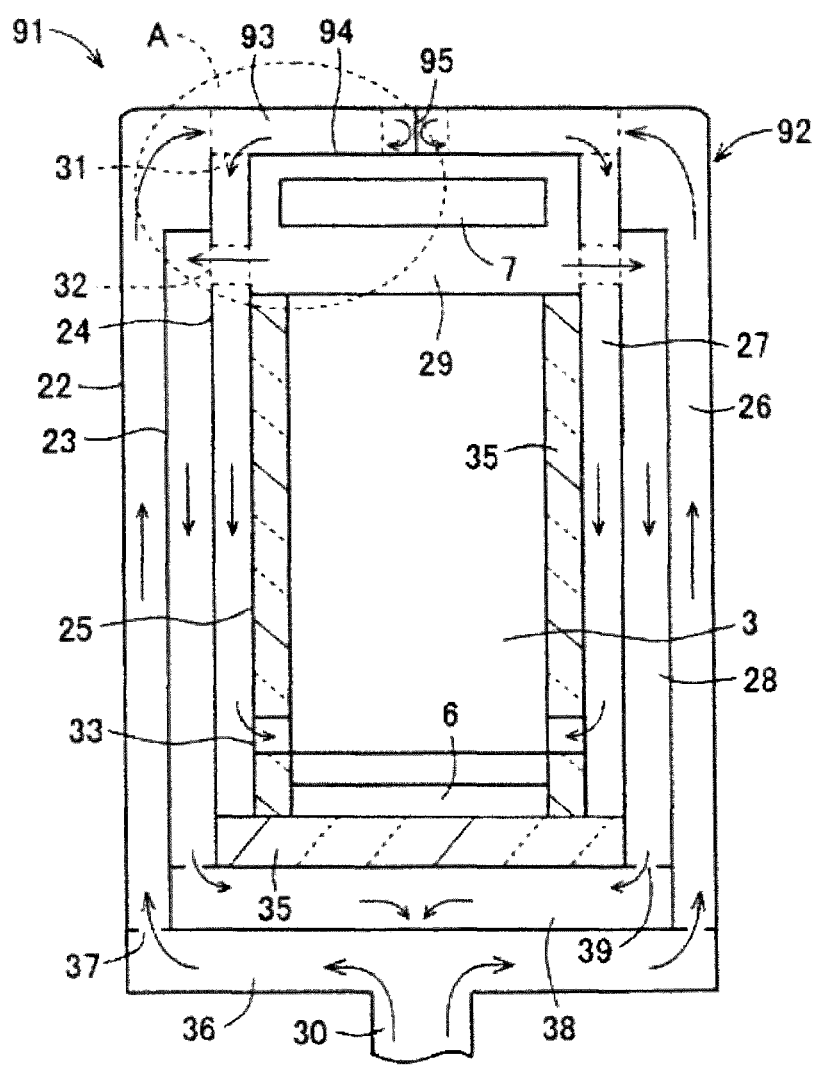
FIG. 25 is a cross-sectional view illustrating the fuel cell module shown in FIG. 24.
Figure 26:
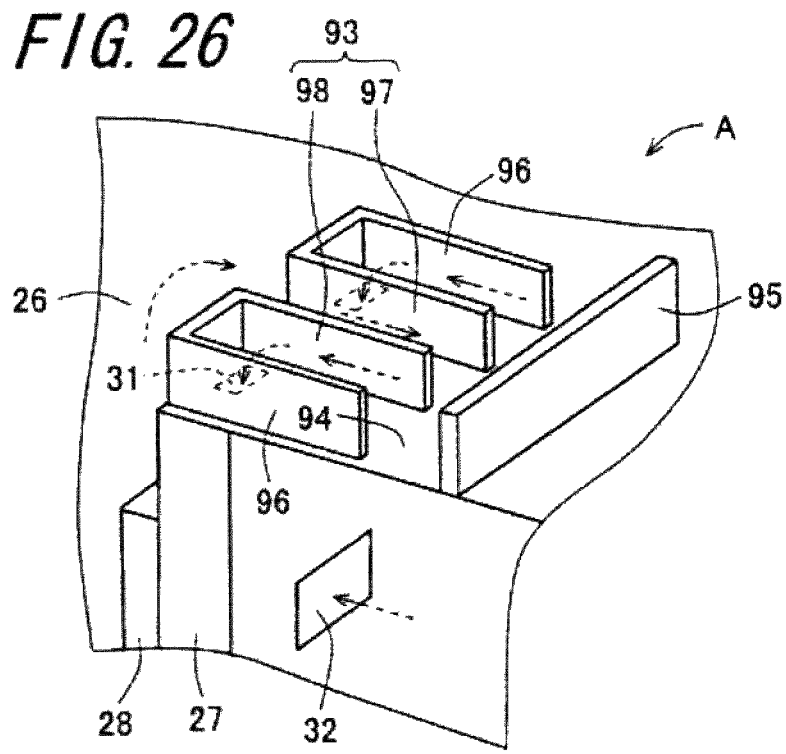
FIG. 26 is a perspective view illustrating a portion of the fuel cell module extracted from and shown in FIG. 25.

FIG. 24 is a perspective view illustrating an exemplary fuel cell module 91, in which the cell stack device 9 is accommodated in a housing container 92, according to an eighth embodiment of the present invention. FIG. 25 is a cross-sectional view schematically illustrating the fuel cell module 91 shown in FIG. 24. FIG. 26 is a view illustrating a portion A circled with a dotted line and extracted from the fuel cell module 91 shown in FIG. 25.

The reaction-gas supply pipe 30 for supplying reaction gas (air) into the housing container 92 is connected to the bottom part of the housing container 92, and reaction gas supplied from the reaction-gas supply pipe 30 flows into the reaction-gas introducing part 36. Since the reaction-gas introducing part 36 is connected to the first flow channel 26 via the reaction-gas introducing port 37, the reaction gas supplied into the reaction-gas introducing part 36 flows into the first flow channel 26 via the reaction-gas introducing port 37. The reaction gas flowing upward through the first flow channel 26 subsequently flows into a fourth flow channel 93 (described later) and flows into the second flow channel 27. The reaction gas flowing in the second flow channel 27 from the upper side to the lower side is supplied into the power generating chamber 29 (fuel cell 3) via the reaction-gas supply port 33 provided on the third wall 25.

Exhaust gas discharged from the fuel cell 3 or exhaust gas generated as a result of burning excess fuel gas in the upper end portion side of the fuel cell 3 flows into the third flow channel 28 via the exhaust-gas flow passage 32 provided on the second wall 24. The exhaust gas flowing in the third flow channel 28 from the upper side to the lower side flows into the exhaust-gas collecting part 38 provided above the reaction-gas introducing part 36 via the exhaust-gas collecting port 39 and is then discharged outside the housing container 92 via the exhaust-gas discharging pipe 34 (refer to FIG. 24) connected to the exhaust-gas collecting part 38.

Therefore, the reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing downward in the third flow channel 28 while flowing upward through the first flow channel 26, and is subjected to heat exchange with heat inside the power generating chamber 29 while flowing downward through the second flow channel 27.

The temperature inside the power generating chamber 29 becomes high due to the heat generated by the power generation of the fuel cell 3 or due to combustion heat when burning excess fuel gas that was not used for power generation in the upper end side of the fuel cell 3. Therefore, efficient heat exchange of the reaction gas with the heat of the power generating chamber 29 allows for reaction gas with a higher temperature to be supplied to the fuel cell 3, thus making it possible to enhance the power generating efficiency of the fuel cell module 91 (fuel cell 3).

Here, by providing a fourth flow channel 93 constituted such that reaction gas flowing upward through the first flow channel 26 returns at the center part in the direction perpendicular to the arrangement direction of the fuel cell 3 after flowing in the direction perpendicular to the arrangement direction of the fuel cell 3 so as to flow into the second flow channel 27, the temperature of the reaction gas supplied to the fuel cell 3 may be higher, thus making it possible to enhance the power generating efficiency of the fuel cell 3 (fuel cell module 91).

The fourth flow channel 93 can be composed of an outward channel through which reaction gas flows into the center part of the direction perpendicular to the arrangement direction of the fuel cell 3, as well as a return channel through which reaction gas is returned from the outward channel and flows into the second flow channel 27.

If heat generated through power generation of the fuel cell 3 or combustion heat in the upper end side of the fuel cell 3 is circulated inside the power generating chamber 29, the temperature above the power generating chamber 29 becomes particularly high. Therefore, in the event of supplying reaction gas (air), it is preferable to utilize the heat above the power generating chamber 29 and it is preferable to arrange at least one of either the abovementioned outward channel or return channel along the outer wall (top wall) 22 constituting the housing container 92 in order to efficiently utilize the heat above the power generating chamber 29. In the housing container 92 shown in FIG. 25, both the outward channel and the return channel constituting the fourth flow channel 93 are formed between the top wall 94 of the power generating chamber 29 and the top wall 22 of the housing container 92, and the upper side of the power generating chamber 29 is partitioned by the fourth flow channel 93. The constitution of the outward channel and the return channel is described in detail with reference to FIG. 26.

Furthermore, a partitioning plate 95 is provided at the center part of the fourth flow channel 93 such that reaction gas flowing from one side of the first flow channel 26 flows into the one side of the second flow channel 27, and reaction gas flowing from the other side of the first flow channel 26 flows into the other side of the second flow channel 27.

That is, reaction gas flowing upward through the first flow channel 26 flows through the outward channel that constitutes the fourth flow channel 93 to the center part side in the direction perpendicular to the arrangement direction of the fuel cell 3 along the top wall (outer wall) 22 that constitutes the housing container 92, returns from the outward channel via the partitioning plate 95 provided in the center part in the direction perpendicular to the arrangement direction of the fuel cell 3 on the top wall 22 that constitutes the housing container 92, flows through the return channel that constitutes the fourth flow channel 93, and finally flows into the second flow channel 27 via the reaction-gas flow port 31. Therefore, reaction gas supplied to the fuel cell 3 may be subjected to heat exchange with high-temperature heat above the power generating chamber 29 while flowing through the outward channel or the return channel that constitutes the fourth flow channel 93, thus making it possible to supply high-temperature reaction gas to the fuel cell 3. Therefore, the power generating efficiency of the fuel cell 3 (fuel cell module 91) may be enhanced.

The outward channel as well as the return channel of the fourth flow channel 93 of reaction gas is described with reference to FIG. 26. FIG. 26 illustrates a state in which the outer wall (top wall) 22 of the housing container 92 has been removed. Reaction gas flowing through the first flow channel 26 flows into the center part side between a plurality of return-flow channel formation members 96 forming a U-shape in a planar view in the direction perpendicular to the arrangement direction of the fuel cell 3. The flow channel between the return-flow channel formation members 96 is an outward channel of the fourth flow channel 93. The reaction gas flowing through the outward channel 97 subsequently returns from the outward channel 97 via the partitioning member 95 and flows within the flow channel formation member 96. The inside of the flow channel formation member 96 becomes a return channel 98 of the fourth flow channel 93. The reaction gas flowing through the return channel 98 flows into the second flow channel 27 via the reaction-gas flow port 31 (provided on the top wall 94 of the power generating chamber) 29 connecting the return channel 98 and the second flow channel 27.

The above constitution makes efficient heat exchange with high-temperature heat above the power generating chamber 29 possible in the heat exchange of reaction gas to be supplied to the fuel cell 3 while the reaction gas is flowing through the outward channel 97 and the return channel 98 of the fourth flow channel 93, thus allowing high-temperature reaction gas to be supplied to the fuel cell 3 to realize the fuel cell module 91 with enhanced power generating efficiency.

Ninth Embodiment

Figure 27:
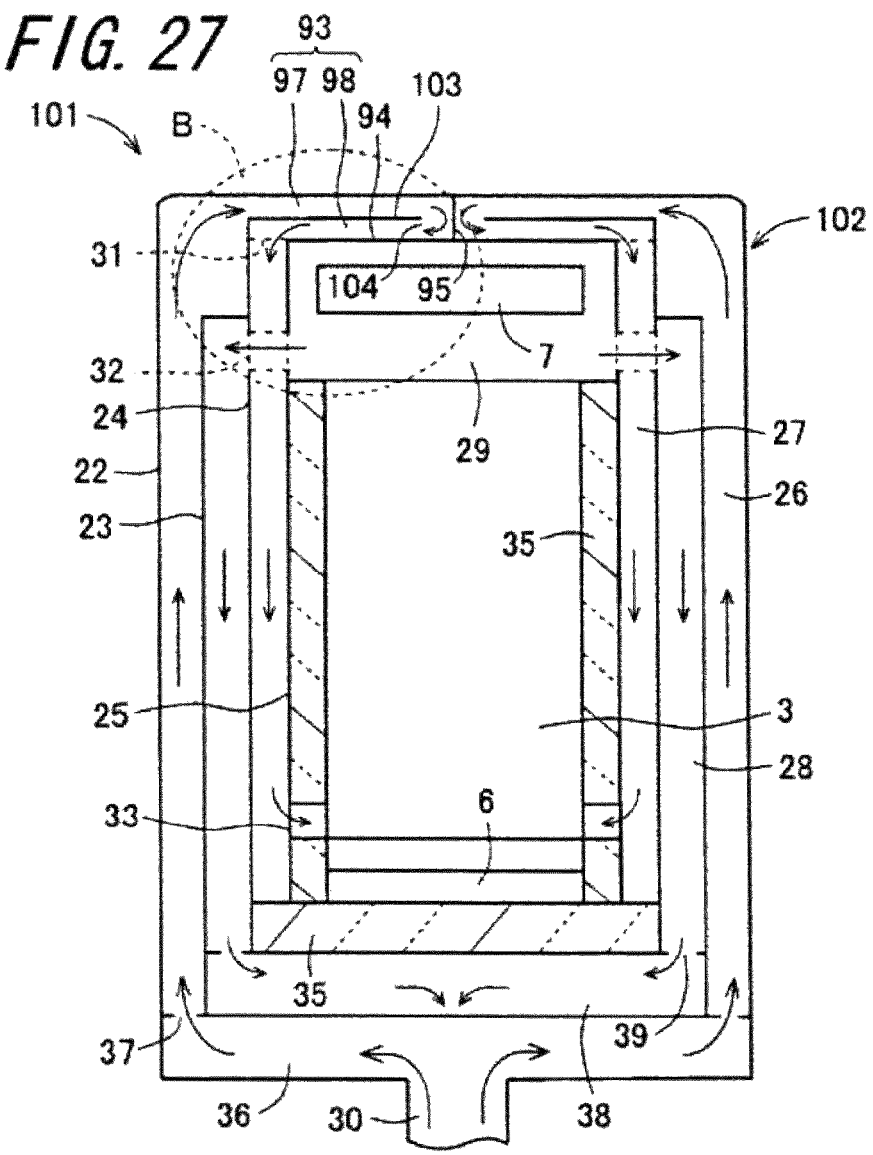
FIG. 27 is a cross-sectional view schematically illustrating a fuel cell module according to a ninth embodiment of the present invention.
Figure 28:
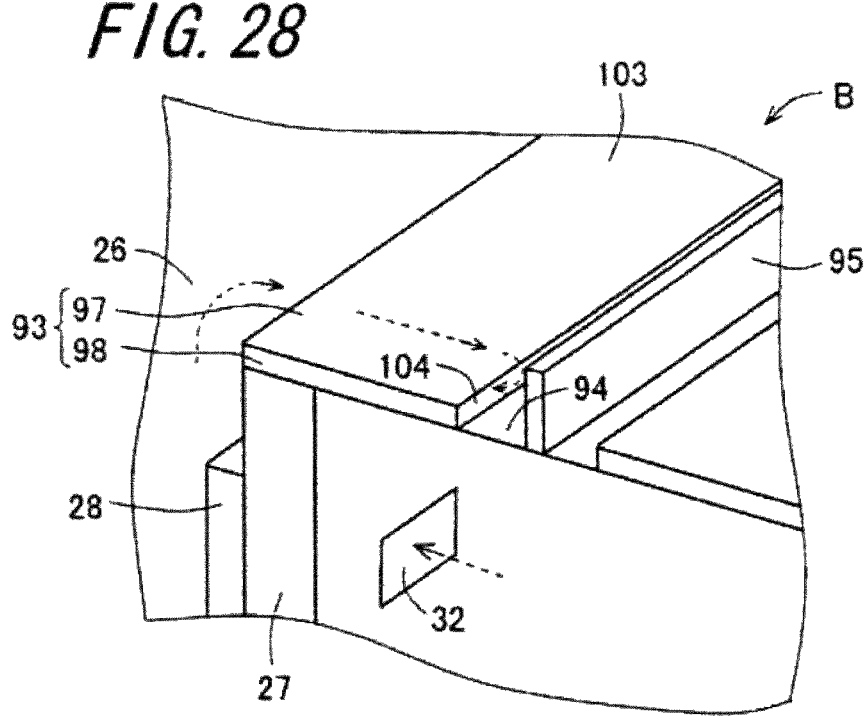
FIG. 28 is a perspective view illustrating a portion of the fuel cell module extracted from and shown in FIG. 27.

FIG. 27 is a cross-sectional view schematically illustrating a fuel cell module 101 according to a ninth embodiment of the present invention, and FIG. 28 is a view illustrating a portion B circled by a dotted line and extracted from the fuel cell module 101 shown in FIG. 27.

In the fuel cell module 101 shown in FIG. 27, a return-flow channel formation member 103 is provided between the upper side of the power generating chamber 29 and the top wall 22 of a housing container 102, and in the fourth flow channel 93, an outward channel 97 is arranged along the top wall 22 of the housing container 102 and a return channel 98 is arranged below. That is, the outward channel 97 and the return channel 98 are arranged vertically with respect to each other. As in the fuel cell module 91 shown in FIG. 25, the upper side of the power generating chamber 29 is partitioned by the fourth flow channel 93.

As a result, reaction gas flowing upward through the first flow channel 26 flows through the outward channel 97 that is formed between the top wall 22 of the housing container 102 and the return-flow channel formation member 103 into the center part side in the direction perpendicular to the arrangement direction of the fuel cell 3, and then returns into the lower side via the partitioning plate 95 provided in the center part. The reaction gas returned into the lower side flows into the return channel 98 formed by the top wall 94 of the power generating chamber 29 and the return-flow channel formation member 103 and flows into the second flow channel 27. The details are described with reference to FIG. 28.

Here, the reaction gas flowing upward through the first flow channel 26 is heated while flowing through the outward channel 97 located above the power generating chamber 29 and heated further by the high heat above the power generating chamber 29 as a result of heat exchange. The heated reaction gas is supplied to the fuel cell 3 (into the power generating chamber 29) via the second flow channel 27, thus making it possible to enhance the power generating efficiency of the fuel cell 3 (fuel cell module 101).

The flow of reaction gas in the outward channel 97 and the return channel 98 is explained with reference to FIG. 28. FIG. 28 shows a state in which the outer wall (top wall) 22 of the housing container 102 has been removed. The reaction gas flowing through the first flow channel 26 flows through the outward channel 97 that is formed by the return-flow channel formation member 103 and the outer wall (top wall) 22 of the housing container into the center part side in the direction perpendicular to the arrangement direction of the fuel cell 3 and returns into the lower side via the partitioning plate 95 provided in the center part. The returned reaction gas flows into the return channel 98 from a flow inlet 104. The reaction gas flowing through the return channel 98 flows into the second flow channel 27 via the reaction-gas flow port 31 (provided on the top wall 94 of the power generating chamber; refer to FIG. 27) connecting the outward channel 98 and the second flow channel 27.

The above constitution makes it possible to effectively utilize the heat above the power generating chamber 29 in the heat exchange of the reaction gas supplied to the fuel cell 3, thus allowing high-temperature reaction gas to be supplied to the fuel cell 3 and realizing the fuel cell module 101 with enhanced power generating efficiency.

Furthermore, the return-flow channel formation member 103 may be a box-like member like the one shown in FIG. 28, or it may be formed by folding part of a plate-like member. The return-flow channel formation member 103 is formed by folding part of a plate-like member, it is preferable to use a deformation suppression member (e.g., a support member to support the return-flow channel formation member 103) in order to suppress the deformation of the return-flow channel formation member 103.

Tenth Embodiment

Figure 29:
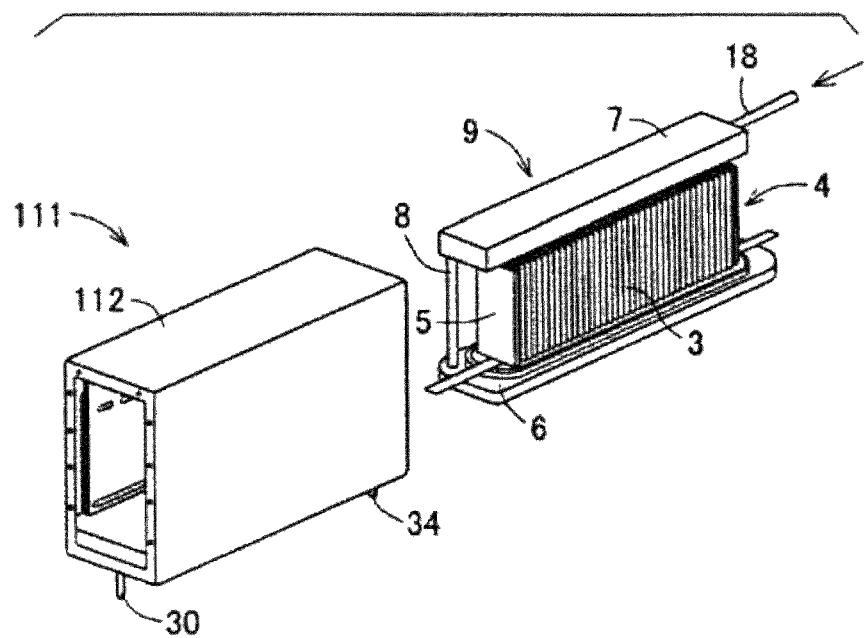
FIG. 29 is a cross-sectional view schematically illustrating a fuel cell module according to a tenth embodiment of the present invention.
Figure 30:
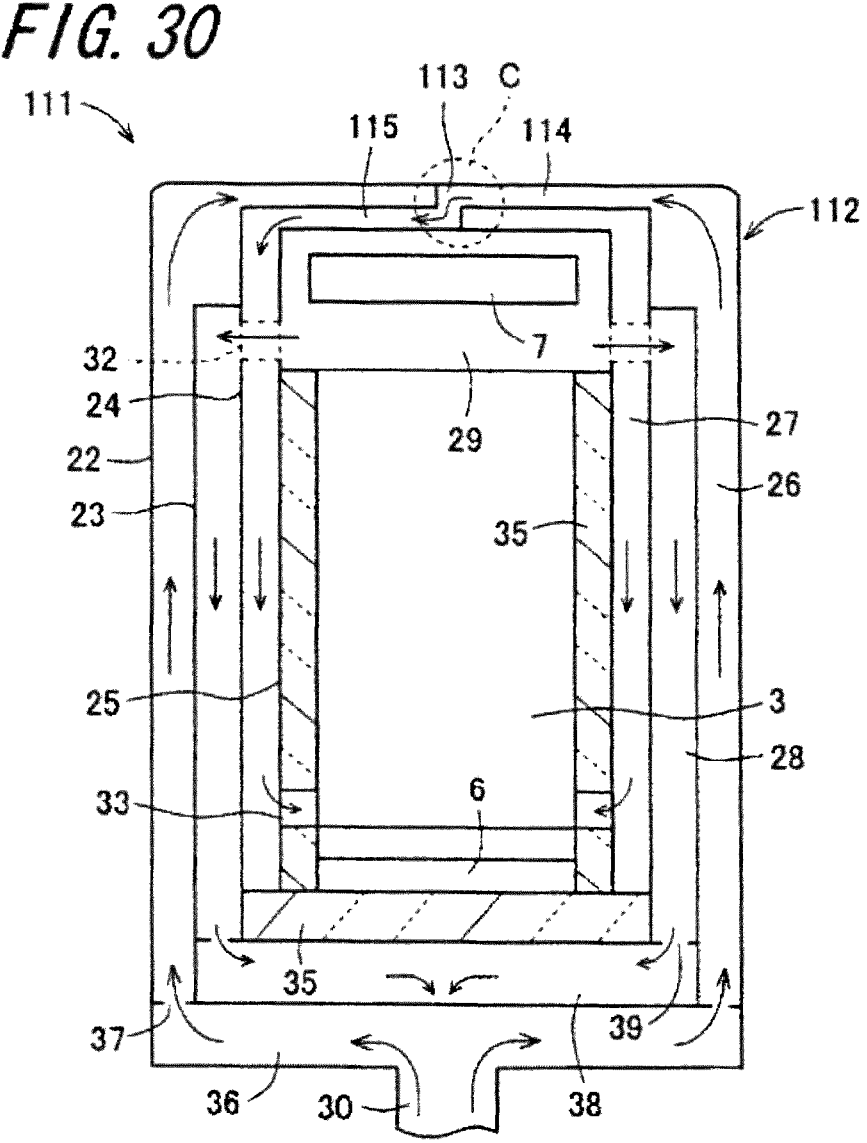
FIG. 30 is a cross-sectional view schematically illustrating the fuel cell module shown in FIG. 29.
Figure 31:
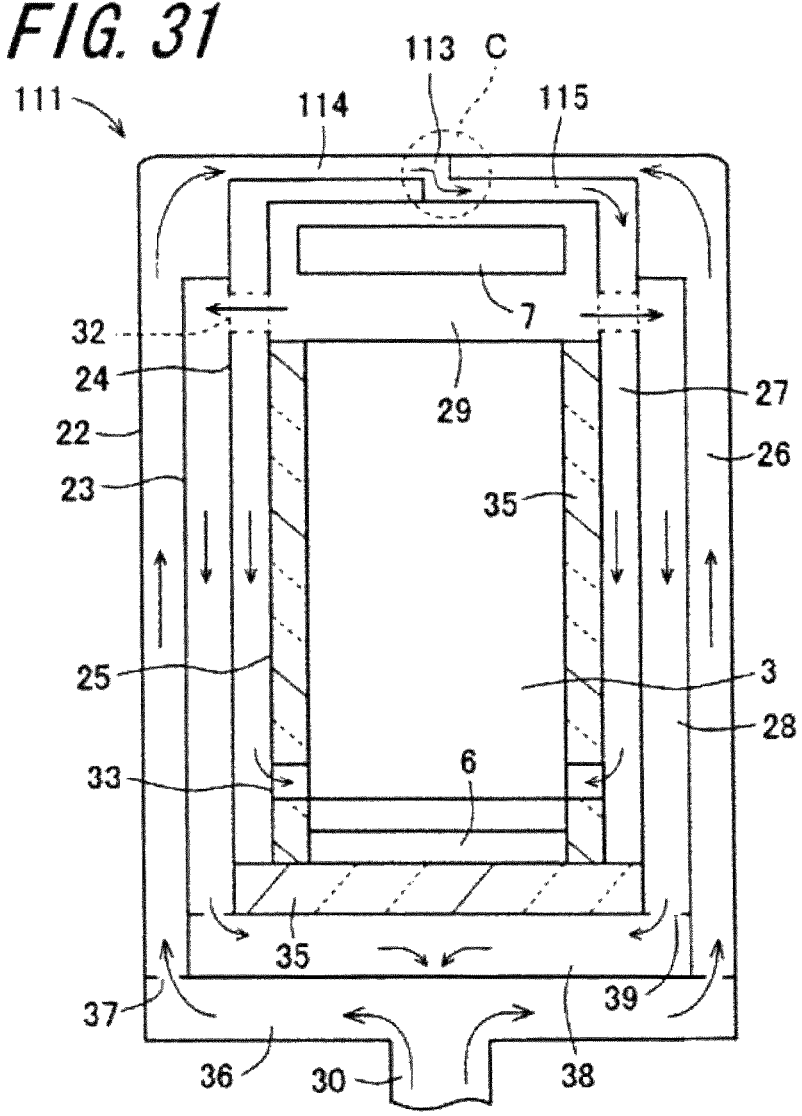
FIG. 31 is a cross-sectional view schematically illustrating the fuel cell module shown in FIG. 29.

FIG. 29 is a perspective view schematically illustrating a fuel cell module 111, in which the cell stack device 9 is accommodated in a housing container 112, according to a tenth embodiment of the present invention. FIG. 30 and FIG. 31 are cross-sectional views schematically showing the fuel cell module 111 shown in FIG. 29, in which a flow of reaction gas from one side along the arrangement direction of the fuel cell 3 to the other side thereof is shown. FIG. 30 and FIG. 31 are cross-sectional views of different portions of the housing container 112.

The reaction-gas supply pipe 30 for supplying reaction gas (air in FIG. 30 and FIG. 31) into the housing container 112 is connected to the bottom part of the housing container 112, and reaction gas supplied from the reaction-gas supply pipe 30 flows into the reaction-gas introducing part 36. Since the reaction-gas introducing part 36 is connected to the first flow channel 26 via the reaction-gas introducing port 37, the reaction gas supplied to the reaction-gas introducing part 36 flows into the fuel cell first flow channel 26 via the reaction-gas introducing port 37.

Here, the reaction gas flowing upward through the first flow channel 26 located on one side along the arrangement direction of the fuel cell 3 (hereinafter sometimes abbreviated as "first flow channel located on one side") subsequently flows into the fourth flow channel 93 (described later) in the direction perpendicular to the arrangement direction of the fuel cell 3 and flows into the second flow channel 27 located on the other side along the arrangement direction of the fuel cell 3 (hereinafter sometimes abbreviated as "second flow channel located on the other side"). The reaction gas flowing from the upper side to the lower side through the second flow channel 27 located on the other side is supplied into the power generating chamber 29 (fuel cell 3) via the reaction-gas supply port 33 provided on the third wall 25.

Exhaust gas discharged from the fuel cell 3 or exhaust gas generated as a result of burning excess fuel gas in the upper end portion side of the fuel cell 3 flows into the third flow channel 28 via the exhaust-gas flow passage 32 provided between the second wall 24 and the third wall 25. The exhaust gas flowing through the third flow channel 28 from the upper side to the lower side flows into the exhaust-gas collecting part 38 provided above the reaction-gas introducing part 36 via the exhaust-gas collecting port 39 and is then discharged outside the housing container 112 via the exhaust-gas discharging pipe 34 (refer to FIG. 29) connected to the exhaust-gas collecting part 38.

Therefore, the reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing downward through the third flow channel 28 while flowing upward through the first flow channel 26, and is subjected to heat exchange with the heat inside the power generating chamber 29 while flowing downward through the second flow channel 27.

Here, FIG. 30 shows an example in which the first flow channel 26 located on one side along the arrangement direction of the fuel cell 3 is regarded as the first flow channel 26 located on the right side of the fuel cell 3 (right side when facing the figure; same applies to all following references to the right side) and the second flow channel 27 located on the other side is regarded as second flow channel 27 located on the left side of the fuel cell (left side when facing the figure; same applies to all following references to the left side), and FIG. 31 shows an example in which the first flow channel 26 located on one side along the arrangement direction of the fuel cell 3 is regarded as the first flow channel located on the left side of the fuel cell 3 and the second flow channel 27 located on the other side is regarded as the second flow channel 27. That is, the phrases "one side" and "the other side" in the present invention refer to one side and another side pinching the fuel cell 3, and when either is referred to as "one side", the other is referred as "the other side".

As shown in FIG. 30 and FIG. 31, in the housing container 112, reaction gas supplied from the reaction-gas supply pipe 30 connected to the bottom part of the housing container 112 and that flows through the first flow channel 26 located on the right side of the fuel cell 3 is supplied into the power generating chamber 29 from the left side of the fuel cell 3, and the reaction gas flowing through the first flow channel 26 located on the left side of the fuel cell 3 is supplied into the power generating chamber 29 from the right side of the fuel cell 3.

As a result, the temperature of the reaction gas supplied from the reaction-gas supply port 33 on both sides along the arrangement direction of the fuel cell 3 can be made more uniform, thus making it possible to realize the fuel cell module 111 with enhanced power generating efficiency.

The temperature inside the power generating chamber 29 becomes high due to the heat generated by power generation of the fuel cell 3 or due to combustion heat when burning, with air, excess fuel gas that has not been used for power generation in the upper end side of the fuel cell 3. Therefore, heat exchange between reaction gas and the heat inside the power generating chamber 29 makes it possible to supply reaction gas with a higher temperature to the fuel cell 3 and enhance the power generating efficiency of the fuel cell module 111 (fuel cell module 3).

Therefore, in the fuel cell module 111 shown in FIG. 30 and FIG. 31, a fourth flow channel 113 through which reaction gas flowing through the first flow channel 26 located on one side flows into the second flow channel 27 located on the other side is provided on the side above the housing container 112 (above the reformer 7).

Here, the fourth flow channel 113 is described with reference to FIG. 30. Reaction gas flowing upward through the first flow channel 26 located on the right side of the fuel cell 3 flows into an upper first flow channel 114 that constitutes the fourth flow channel 113 and flows in the direction (center part side) perpendicular to the arrangement direction of the fuel cell 3. The reaction gas flowing through the upper first flow channel 114 flows, at a reaction-gas flow-direction changing part C located in the center part, into an upper second flow channel 115 that constitutes the fourth flow channel 113. The reaction gas flowing through the upper second flow channel 115 flows into the second flow channel 27 located on the left side of the fuel cell 3 and then flows into the power generating chamber 29 from the reaction-gas supply port 33.

Since the upper first flow channel 114 is arranged along the top wall (outer wall) 22 that constitutes the housing container 112 and the upper second flow channel 115 is arranged below in the fourth flow channel 113 that connects the first flow channel 26 located on one side and the second flow channel 27 located on the other side, heat exchange with high-temperature heat above the power generating chamber 29 is possible while reaction gas flows through the upper first flow channel 114 and the upper second flow channel 115 that constitute the fourth flow channel 113, thus allowing high-temperature reaction gas to be supplied to the fuel cell 3. Therefore, the power generating efficiency of the fuel cell 3 (fuel cell module 111) may be enhanced. The same applies to FIG. 31.

Figure 32:
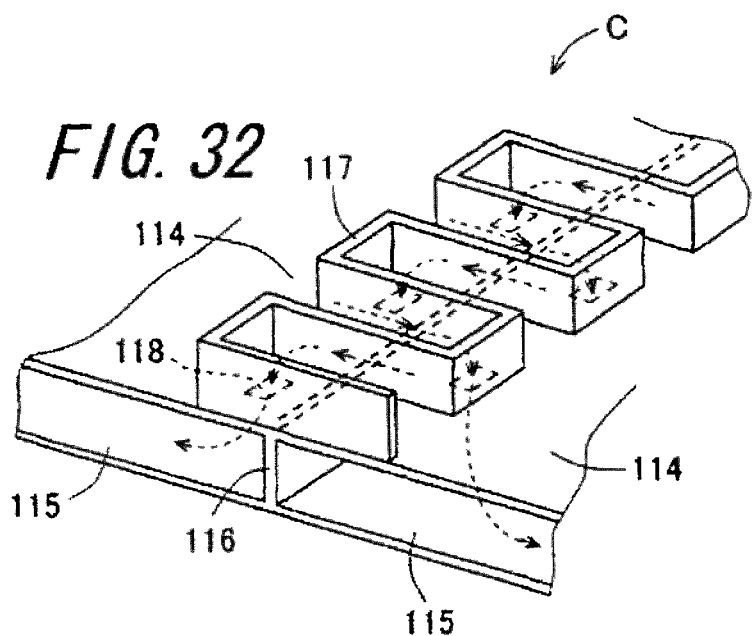
FIG. 32 is a perspective view illustrating a portion of the fuel cell module extracted from and shown in FIG. 30.
Figure 33:
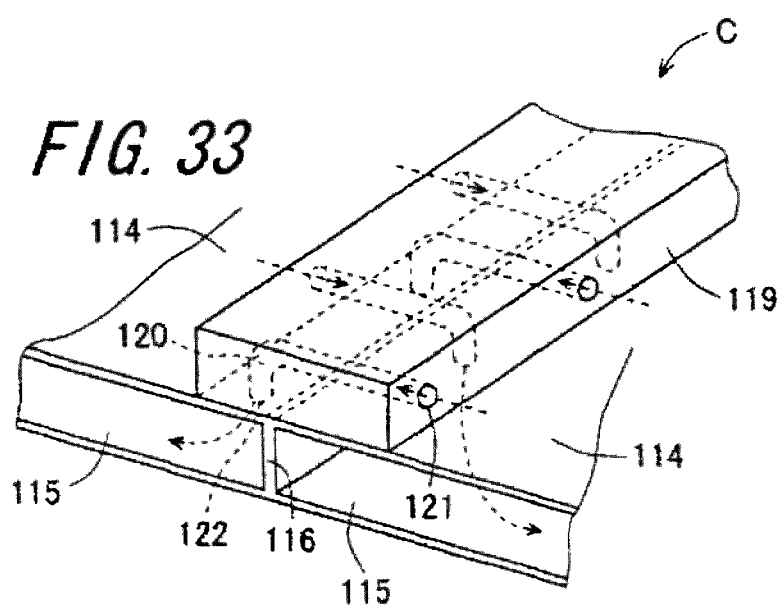
FIG. 33 is a perspective view illustrating a portion of the fuel cell module extracted from and shown in FIG. 30.

The reaction-gas flow-direction changing part C is described with reference to FIG. 32 and FIG. 33. FIG. 32 and FIG. 33 show a state in which the top wall (outer wall) 22 constituting the housing container 112 has been removed. In FIG. 32, the upper second flow channel 115 is divided into the right and left sides by a partitioning plate 116, and a reaction-gas flow-direction changing member 117 is arranged above the partitioning plate 116. The reaction-gas flow-direction changing member 117 divides the upper first flow channel 14 into the right and left sides. FIG. 32 shows the shape of the reaction-gas flow-direction changing member 17 as a shape comprising a continuous series of L-shaped plate members so that the long sides face each other.

The reaction gas flowing upward through the first flow channel 26 located on one side flows into the upper first flow channel 114 connected to the first flow channel 26 located on the one side thereof. The reaction gas flowing through the upper first flow channel 114 flows into a portion surrounded by the L-shaped plate member (depth direction) and flows into the upper second flow channel 115 located on the other side (the side near the first flow channel 26 located on the other side) via a reaction-gas flow hole 118 provided at the depth portion (the side near the first flow channel 26 located on the other side). The reaction gas flowing through the upper second flow channel 115 located on the other side flows into the second flow channel 27 located on the other side that is connected to the upper second flow channel 115 located on the other side, and is then supplied into the power generating chamber 29. As a result, the reaction gas flowing upward through the first flow channel 26 located on one side ends up flowing in the second flow channel 27 located on the other side.

The reaction gas may be evenly supplied by the second flow channel 27 and may be supplied evenly to the fuel cell 3 constituting the cell stack 4 by constituting the reaction-gas flow-direction changing member 117 along the arrangement direction of the fuel cell 3 so as to alternately switch the flow of reaction gas flowing into the left side from the right side and reaction gas flowing from the left side into the right side when facing FIG. 32. As a result, the power generating efficiency may be enhanced.

The interval between each of the mutually facing long sides of the L-shaped plate member in the reaction-gas flow-direction changing member 117 may be appropriately set according to the size or quantity of the fuel cells 3 constituting the cell stack 4.

For the reaction-gas flow-direction changing part C shown in FIG. 33, the upper second flow channel 115 is divided into the right and left sides by the partitioning plate 116, and a reaction-gas flow-direction changing member 119 is arranged above the partitioning plate 116. The reaction-gas flow-direction changing member 119 divides the upper first flow channel 114 into the right and left sides. In FIG. 33, a reaction-gas flow hole 120, through which reaction gas flowing through the upper first flow channel 114 located one side flows into the upper second flow channel 115 located on the other side, is provided inside the rectangular parallelepiped-shaped member as the shape of the reaction-gas flow-direction changing member 119. FIG. 33, the reaction-gas flow hole 120 is formed in a shape in which part of a cylindrical shape has been bent.

The reaction gas flowing upward through the first flow channel 26 located on one side flows into the upper first flow channel 114 connected to the first flow channel 26 located on one side thereof. The reaction gas flowing through the upper first flow channel 114 from the first flow channel 26 located on one side flows through the reaction-gas flow hole 120 from the flow-in part (inlet) of the reaction-gas flow hole 120 and flows into the upper second flow channel 115 located on the other side from the flow-out part (outlet) 122 of the reaction-gas flow hole 120. Reaction gas flowing through the upper second flow channel 115 located on the other side (side near the first flow channel 26 located on the other side) flows into the second flow channel 27 located on the other side that is connected to the upper second flow channel 115 located on the other side, and is then supplied into the power generating chamber 29. As a result, the reaction gas flowing upward through the first flow channel 26 located on one side ends up flowing through the second flow channel 27 located on the other side, thus making the temperature of the reaction gas supplied from the side near the fuel cell 3 more uniform and allowing the power generating efficiency to be enhanced.

As with the reaction-gas flow-direction changing member 117 shown in FIG. 32, the reaction gas may be evenly supplied by the second flow channel 27 and may be supplied evenly to the fuel cell 3 that constitutes the cell stack 4 by constituting a reaction-gas flow-direction changing member 119 along the arrangement direction of the fuel cell 3 so as to alternately switch the flow of reaction gas flowing to the left side from the right side and reaction gas flowing from the left side to the right side when facing the FIG. 33. As a result, the power generating efficiency may be enhanced. In addition, the interval of the reaction-gas flow hole 120 in the shape in which part of a cylindrical shape has been bent may be appropriately set according to the size or quantity of the fuel cells 3 constituting the cell stack 4.

By constituting the reaction-gas flow-direction changing part C as described above, reaction gas flowing upward through the first flow channel 26 located on one side can easily flow into the second flow channel 27 located on the other side.

Eleventh Embodiment

Figure 34:
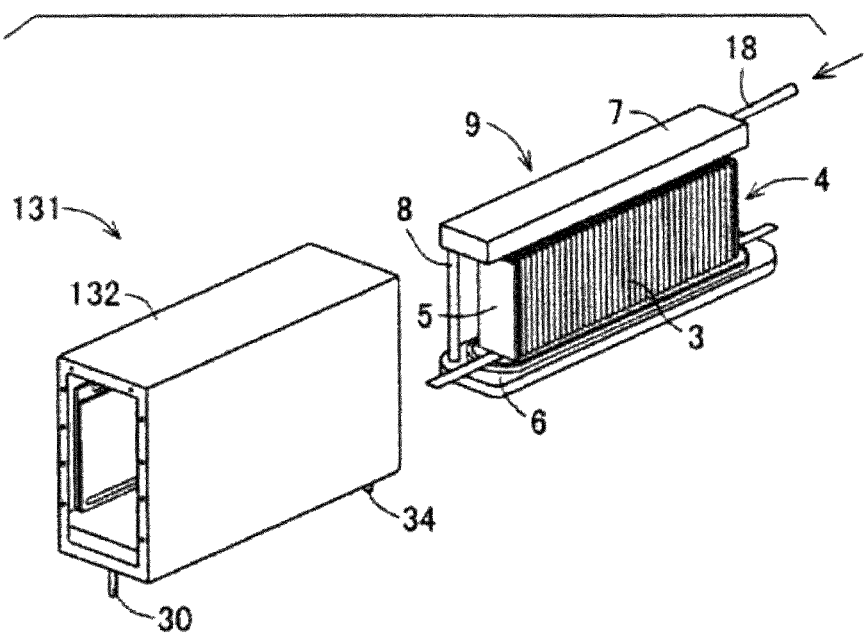
FIG. 34 is a perspective view of an outward appearance showing a fuel cell module 131 in which the cell stack device 9 is accommodated in a housing container 132.
Figure 35:
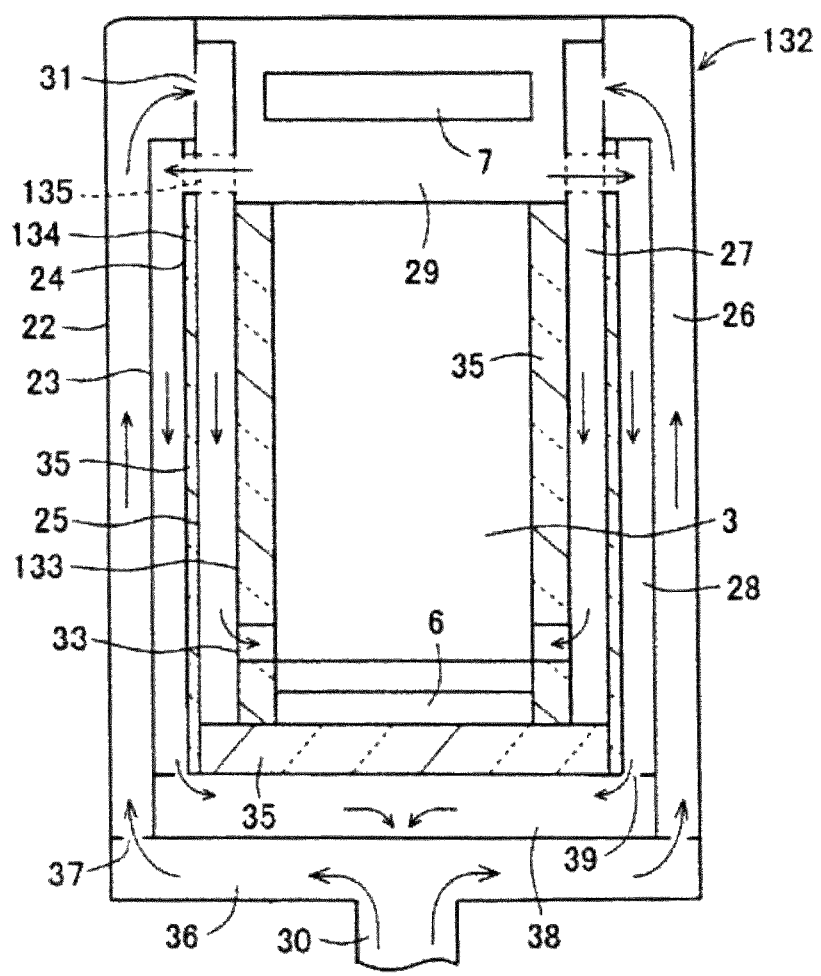
FIG. 35 is a cross-sectional view schematically illustrating the fuel cell module shown in FIG. 34.
Figure 36:
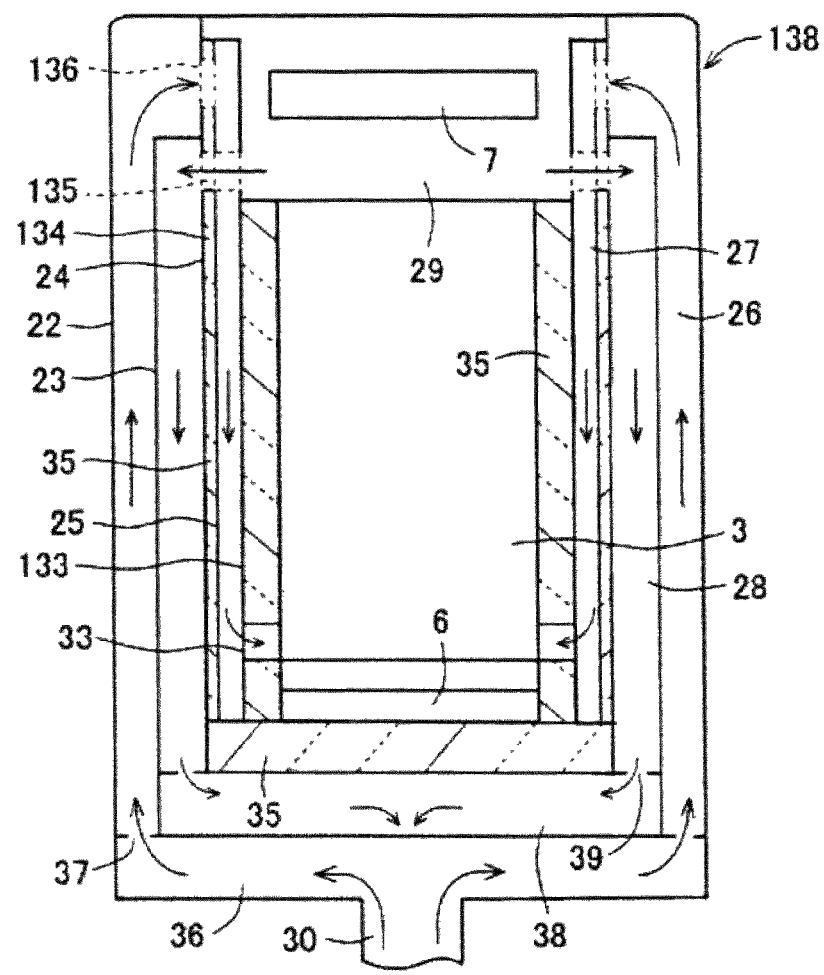
FIG. 36 is an exemplary cross-sectional view schematically illustrating the fuel cell module according to the eleventh embodiment of the present invention.

FIG. 34 is a perspective view illustrating a fuel cell module 131, in which the cell stack device 9 is accommodated in a housing container 132, according to the present invention. FIG. 35 is a cross-sectional view schematically illustrating the fuel cell module 131 shown in FIG. 24, and FIG. 36 is a cross-sectional view schematically illustrating a fuel cell module 137 according to another example of the present embodiment in which the cell stack device 9 is accommodated in a housing container 138 and is provided with a heat-exchange suppression part 134 (described later).

In the housing container 132, the first wall 23 is formed inside the outer wall 22 at a predetermined interval, a fourth wall 133 is arranged inside the first wall 23 at a predetermined interval, a second wall 24 is arranged inside the fourth wall 133 at a predetermined interval, and the third wall 25 is arranged inside the second wall 24 at a predetermined interval.

As a result, a space formed by the outer wall 22 and the first wall 23 becomes the first flow channel 26, a space formed by the second wall 24 and the third wall 25 becomes the second flow channel 27, and a space formed by the first wall 23 and the fourth wall 133 becomes the third flow channel 28, and a space formed by the fourth wall 133 and the second wall 24 becomes the heat-exchange suppression part 134. Therefore, the heat-exchange suppression part 134 is formed between the second flow channel 27 and the third flow channel 28.

In the housing container 132 shown in FIG. 35, the upper end of the first wall 23 is connected to the second wall 24, the upper end of the second wall 24 is connected to the top wall (outer wall 22) of the housing container 132, and the upper end of the third wall 25 is connected to the second wall 24 on the side closer to the top wall of the housing container 132 from the connection part of the first wall 23 and the second wall 24. Furthermore, the upper end of the third wall 25 may also be connected to the top wall (outer wall 22) of the housing container 132. Moreover, the upper end of the fourth wall 133 is connected to the upper end of the first wall 23 in the example displayed, but it is also possible to provide a constitution in which the upper end of the fourth wall 133 is connected to the second wall 24 on the lower side of an exhaust-gas flow passage 135 (described later) and that connects the power generating chamber 29 and the third flow channel 28.

A reaction-gas supply pipe 30 for supplying reaction gas (air) into the housing container 132 is connected to the bottom part of the housing containers 132, 138, and reaction gas supplied from the reaction-gas supply pipe 30 flows into the reaction-gas introducing part 36. Since the reaction-gas introducing part 36 is connected to the first flow channel 26 via the reaction-gas introducing inlet 37, reaction gas flowing through the reaction-gas introducing part 36 flows into the first flow channel 26 via the reaction-gas introducing inlet 37. The reaction gas flowing upward through the first flow channel 26 flows into the second flow channel 27 via the reaction-gas flow port 31 (equivalent to the reaction-gas flow passage 136 in FIG. 36) provided on the second wall 24. The reaction gas flowing downward through the second flow channel 27 is supplied into the power generating chamber 29 via the reaction-gas supply port 33 provided on the third wall 25.

Exhaust gas discharged from the fuel cell 3 or exhaust gas generated as a result of burning excess fuel gas on the upper end portion side of the fuel cell 3 flows into the third flow channel 28 via the exhaust-gas flow passage 135 that connects the power generating chamber 29 and the third flow channel 28 and is provided between the fourth wall 133 (or the second wall 24 depending on the shape of the fourth wall 133) and the third wall 25. The exhaust gas flowing downward through the third flow channel 28 flows into the exhaust-gas collecting part 38 via the exhaust-gas collecting port 39 and is then discharged outside the housing containers 132, 138 via the exhaust-gas discharging pipe 34 (refer to FIG. 34) connected to the exhaust-gas collecting part 38.

Therefore, the reaction gas supplied from the reaction-gas supply pipe 30 is subjected to heat exchange with the exhaust gas flowing in the exhaust-gas collecting part 38 while flowing through the reaction-gas introducing part 36, and is subjected to heat exchange with the exhaust gas flowing in the third flow channel 28 while flowing through the first flow channel 26, and is subjected to heat exchange with the heat inside the power generating chamber 29 while flowing through the second flow channel 27.

As a result, since the temperature of the reaction gas may be increased efficiently, the a fuel cell modules 131, 137 may be realized with high power generating efficiency.

The size of each of the first flow channel 26, the second flow channel 27, and the third flow channel 28 is preferably larger than the profile of the side portion along the arrangement direction of the fuel cell 3 that constitutes the cell stack 4 to ensure efficient heat exchange with the reaction gas or exhaust gas flowing in each flow channel.

Since the reaction gas supplied into the power generating chamber 29 from the reaction-gas supply port 33 ends up flowing toward the side near the upper end portion from the lower end side of the fuel cell 3, efficient power generation of the fuel cell 3 is possible.

FIG. 35 shows an example in which the cell stack device 9 including a column of cell stack 4 is accommodated inside the power generating chamber 29, and in this case, reaction gas is introduced from both side surface sides of the fuel cell 3. Therefore, because reaction gas is supplied into the power generating chamber 29 from the reaction-gas supply port 33 located on both side surface sides in the power generating chamber 29, it is no longer necessary to provide a reaction-gas introducing member hanging in the power generating chamber 29, and the fuel cell module 131 becomes particularly useful when one cell stack 4 is arranged inside the power generating chamber 29.

Here, the reaction gas supplied from the reaction-gas supply pipe 30 flows through the first flow channel 26 as well as the second flow channel 27 and is supplied into the power generating chamber 29, but the temperature of the reaction gas flowing through the second flow channel 27 becomes high as a result of heat exchange with the heat inside the power generating chamber 29. On the other hand, since exhaust gas flowing through the third flow channel 28 from the power generating chamber 29 is subjected to heat exchange with the reaction gas flowing through the first flow channel 26 and does not have a high temperature, there is a risk that the temperature may end up being lower than that of the reaction gas flowing through the second flow channel 27. In conjunction with this, due to the heat exchange between the reaction gas flowing through the second flow channel 27 and the exhaust gas flowing through the third flow channel 28, the temperature of the reaction gas flowing through the second flow channel 27 may become low, and there is a risk of lowering the power generation output of the fuel cell 3.

Therefore, a heat-exchange suppression part 134 for suppressing heat exchange between the reaction gas flowing through the second flow channel 27 and the exhaust gas flowing through the third flow channel 28 is provided in the fuel cell modules 131, 137 in at least one of either between the first wall 23 and the second wall 24 or between the second wall 24 and the third wall 25 (or between the second flow channel 27 and the third flow channel 28).

As a result, heat exchange between the reaction gas flowing through the second flow channel 27 and the exhaust gas flowing through the third flow channel 28 may be suppressed, and decreases in the temperature of the reaction gas flowing through the second flow channel 27 may also be suppressed. As a result, high-temperature reaction gas may be supplied to the fuel cell 3, and the fuel cell modules 131, 137 may be realized with high power generating efficiency.

Here, FIG. 35 shows an example in which a space formed by the second wall 24 and the fourth wall 133, which is connected at a position lower than the reaction-gas flow port 31 provided above the second wall 24, is constituted as the heat-exchange suppression part 134, and FIG. 36 shows an example in which a space formed by the second wall 24 and the fourth wall 133, which is connected at a position higher than the reaction-gas flow port 136 provided above the second wall 24, is constituted as the heat-exchange suppression part 134. That is, the heat-exchange suppression part 134 is formed along the third flow channel 28 in FIG. 35 and is formed along the second flow channel 27 in FIG. 36.

Heat exchange between the reaction gas flowing through the second flow channel 27 and the exhaust gas flowing through the third flow channel 28 may be suppressed by providing the heat-exchange suppression part 134 between the second flow channel 27 and the third flow channel 28, thus allowing high-temperature reaction gas to be supplied to the fuel cell 3.

The inside of the heat-exchange suppression part 134 is preferably a space with low heat conductivity in order to efficiently suppress heat exchange between the reaction gas flowing through the second flow channel 27 and the exhaust gas flowing through the third flow channel 28. Therefore, the inside of the heat-exchange suppression part 134 may be a vacuum, or, alternatively, air, insulating material, concrete, glass, and the like may also be arranged inside the heat-exchange suppression part 234, and based on considerations of the constitution of the fuel cell module 131, the cost and the like, it is particularly preferable to arrange an insulating material. Furthermore, the insulating material is preferably in a shape that can be easily arranged within the heat-exchange suppression part 134 and may be an insulating material with a granular shape or a plate-like shape, for example.

Here, for effective suppression of decreases in the temperature of the reaction gas flowing through the second flow channel 27, the respective sizes of both the second flow channel 27 and the third flow channel 28 are preferably larger than the profile of the side portion along the arrangement direction of the fuel cell 3 that constitutes the cell stack 4, and the size of the heat-exchange suppression part 134 provided between the second flow channel 27 and the third flow channel 28 is preferably larger than the profile of the side portion along the arrangement direction of the fuel cell 3 that constitutes the cell stack 4.

That is, the preferable size of the heat-exchange suppression part 134 includes a width that is greater than the width in the arrangement direction of the fuel cell 3 constituting the cell stack 4 and a width that is greater than the width in the longitudinal direction of the fuel cell 3.

As a result, heat inside the power generating chamber 29 or heat generated by the power generation of the fuel cell 3 can be effectively subjected to heat exchange (heat transfer) with reaction gas flowing through the second flow channel 27, and at the same time, heat exchange between the reaction gas flowing through the second flow channel 27 and the exhaust gas flowing through the third flow channel 28 may be suppressed, thus allowing high-temperature reaction gas to be supplied to the fuel cell 3. Furthermore, decreases in the temperature of the cell stack 4 may also be suppressed while the reaction gas flows through the second flow channel 27 by making the size of the heat-exchange suppression part 134 larger than the profile of the side portion along the arrangement direction of the fuel cell 3 that constitutes the cell stack 4.

FIG. 35 as well as FIG. 36 show an example in which the insulating material 35 is arranged in the heat-exchange suppression part 134 and is formed in a shape such that when it is arranged in the heat-exchange suppression part 134, the lower end of the insulating material 35 arranged in the heat-exchange suppression part 134 in FIG. 35 is at a position lower than the lower end of the fuel cell 3 while the upper end thereof is at a position higher than the upper end of the fuel cell 3. Furthermore, the insulating material 35 arranged in the heat-exchange suppression part 134 in FIG. 36 is arranged in the heat-exchange suppression part 134 in a form such that the upper end thereof is at a position higher than the upper end of the fuel cell 3. Although this is not illustrated in the figures, the insulating material 35 arranged in the heat-exchange suppression part 234 has a width that is greater than the width in the arrangement direction of the fuel cell 3 and is constituted with a size that is larger than the profile of the side portion along the arrangement direction of the fuel cell 3 that constitutes cell stack 4. As a result, heat exchange between the reaction gas flowing through the second flow channel 27 and the exhaust gas flowing through the third flow channel 28 may be effectively suppressed and decreases in the temperature of the cell stack 4 may also be suppressed, thus making it possible to realize the fuel cell modules 131, 137 with high power generating efficiency.

As described above, within the housing containers 132, 138, a fuel cell module simply has to be equipped with the first flow channel 26 through which reaction gas supplied from the reaction-gas supply pipe 30 flows upward, the second flow channel 27 through which reaction gas flowing through the first flow channel 26 is supplied into the power generating chamber 29 (fuel cell), the third flow channel 28 through which exhaust gas inside the power generating chamber 29 is passed down toward the lower side, and the heat-exchange suppression part 134 between the second flow channel 27 and the third flow channel 28, and the constitution of each of the flow channels may be set in an appropriate manner.

Twelfth and Thirteenth Embodiment

Figure 37:
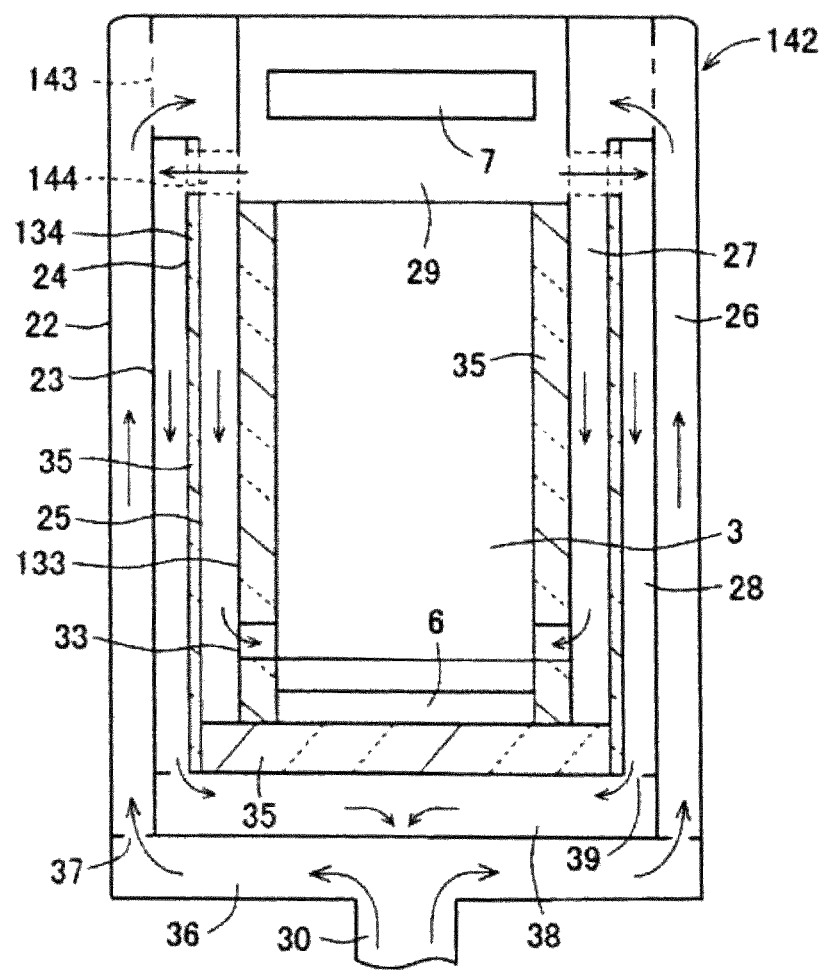
FIG. 37 is a cross-sectional view schematically illustrating the fuel cell module according to the twelfth embodiment of the present invention.
Figure 38:
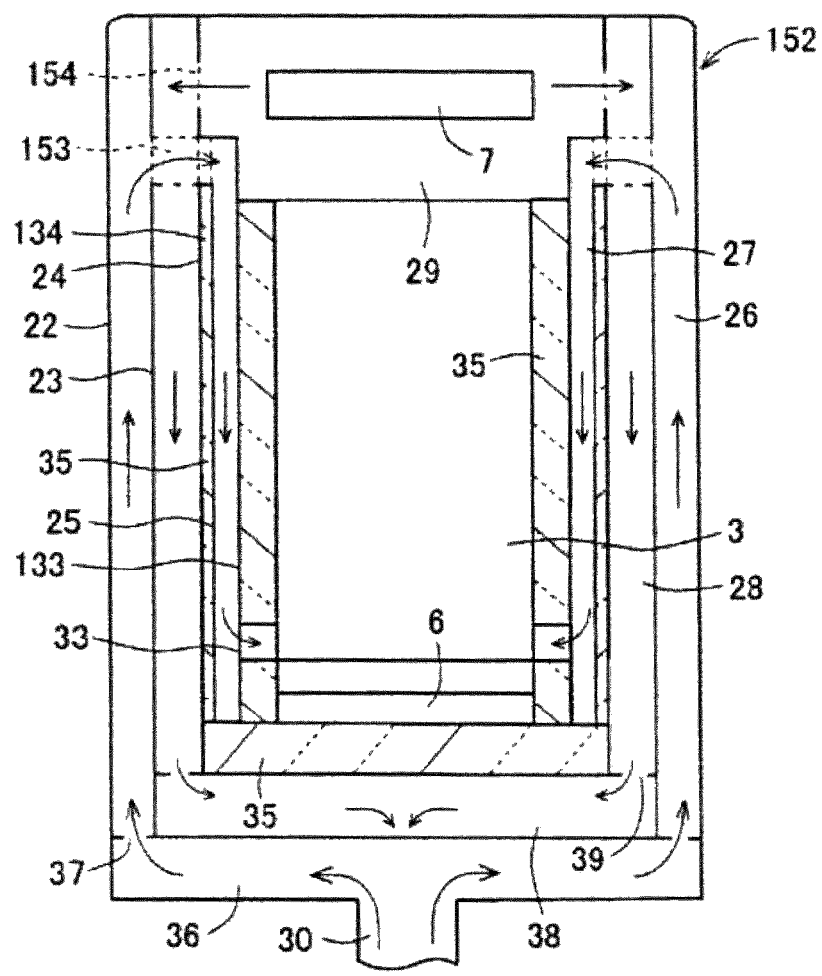
FIG. 38 is a cross-sectional view schematically illustrating the fuel cell module according to the thirteenth embodiment of the present invention.

FIG. 37 illustrates a fuel cell module 141, in which the cell stack device 9 is accommodated in the housing container 142, according to a twelfth embodiment of the present invention. FIG. 38 illustrates a fuel cell module, in which the cell stack device 9 is accommodated in the housing container 152, according to a thirteenth embodiment of the present invention. In the housing container 142 shown in FIG. 37, the upper end of the first wall 23 is connected to the top wall (outer wall 22) of the housing container 142, and a reaction-gas flow port 143 for connecting the first flow channel 26 and the second flow channel 27 is provided on the first wall 23. The upper ends of the fourth wall 133 and the second wall 24 are connected at a position lower than the reaction-gas flow port 143 of the first wall 23. Furthermore, the upper end of the third wall 25 is connected to the top wall of the housing container 142, and an exhaust-gas flow passage 144 that connects the power generating chamber 29 and the third flow channel 28 is provided between the fourth wall 133 and the third wall 25. Furthermore, the third wall 25 may also be connected to the first wall on the side closer to the top wall of the housing container 142 (or the side higher than the reaction-gas flow port 143) from the connection part of the first wall 23 and the fourth wall 133 (or the second wall 24). That the housing container 142 shown in FIG. 37 is an example in which the heat-exchange suppression part 134 is provided along the third flow channel 28.

Moreover, in the housing container 152 shown in FIG. 38, the upper end of the first wall 23 is connected to the top wall (outer wall 22) of the housing container 152 and the upper end of the second wall 24 is connected to the top wall (outer wall 22) of the housing container 152. An exhaust-gas flow port 154 that connects the power generating chamber 29 and the third flow channel 28 is provided on the second wall 24. A reaction-gas flow passage 153 that connects the first flow channel 26 and the second flow channel 27 is provided between the first wall 23 and the fourth wall 133 (or the second wall 24). Moreover, the upper end of the third wall 25 is connected to the second wall 24 in the lower side of the exhaust-gas flow port 154 of the second wall 24 at a position that is equal to or higher than the upper end portion of the reaction-gas flow passage 153. Furthermore, the upper end of the second wall 24 may also be connected to the first wall 23 on the side closer to the top wall of the housing container 152 from the exhaust-gas flow port 154. FIG. 38 shows an example of the housing container 152 in which the heat-exchange suppression part 134 is provided along the second flow channel 27.

In addition, in the housing container 142 and the housing container 152 shown in FIG. 37 and FIG. 38, reaction gas supplied from the reaction-gas supply pipe 30 flows upward through the first flow channel 26 and flows into the fuel cell 3 through the reaction gas flowing through the first flow channel 26 subsequently flows through the second flow channel 17. The exhaust gas inside the power generating chamber 29 flows though the third flow channel 28 and is discharged outside the housing container 142 and the housing container 152. At this time, because the heat-exchange suppression part 134 is provided between the second flow channel 27 and the third flow channel 28, heat exchange between the reaction gas flowing through the second flow channel 27 and the exhaust gas flowing through the third flow channel 28 may be suppressed, and decreases in the temperature of the reaction gas flowing through the second flow channel 27 may thereby be suppressed. As a result, high-temperature reaction gas may be supplied to the fuel cell 3, thus allowing a fuel cell module with high power generating efficiency to be realized.

Fourteenth Embodiment

Figure 39:
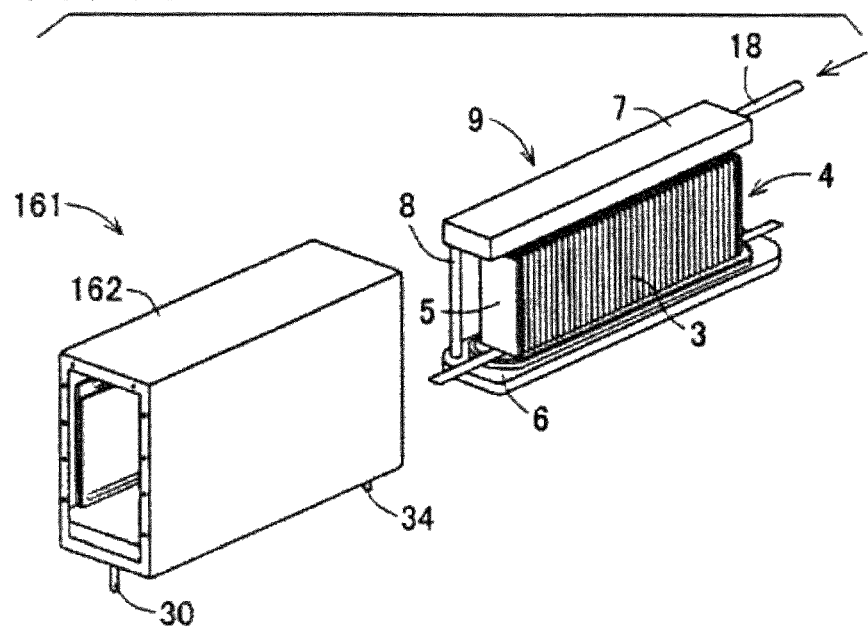
FIG. 39 is a cross-sectional view schematically illustrating the fuel cell module according to the fourteenth embodiment of the present invention.
Figure 40:
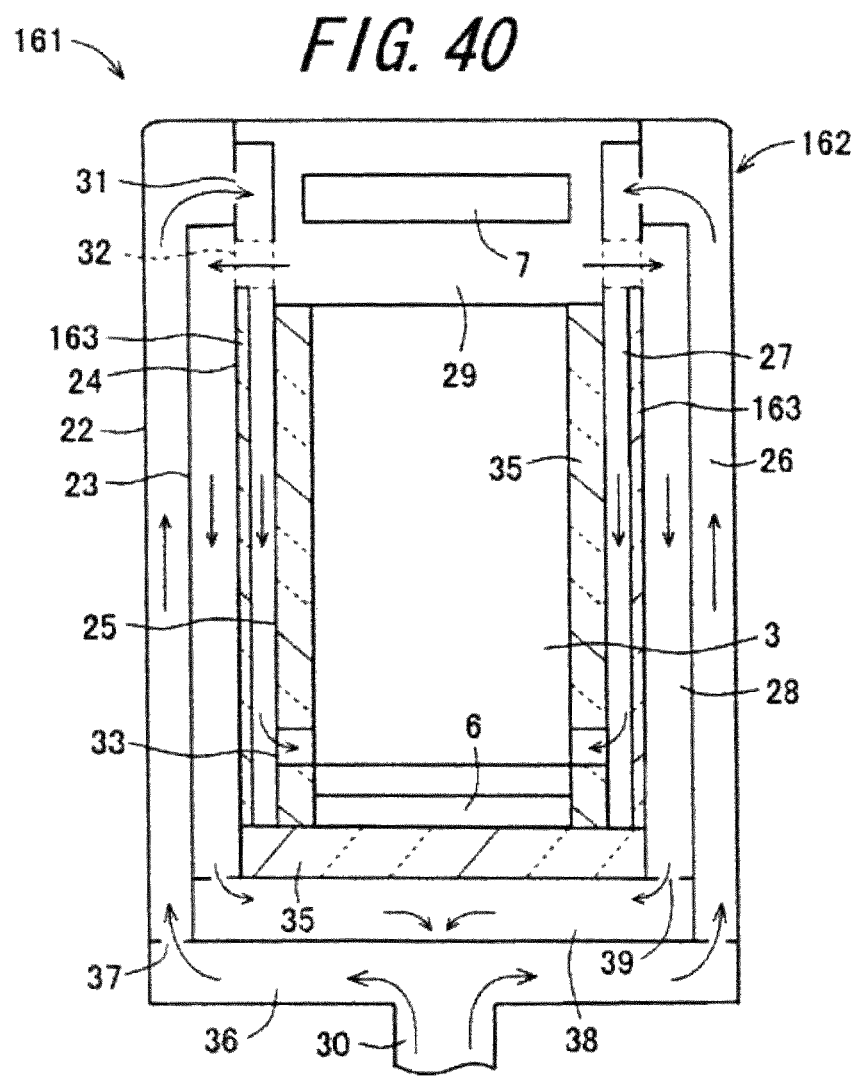
FIG. 40 is a cross-sectional view schematically illustrating the fuel cell module shown in FIG. 39.
Figure 41:
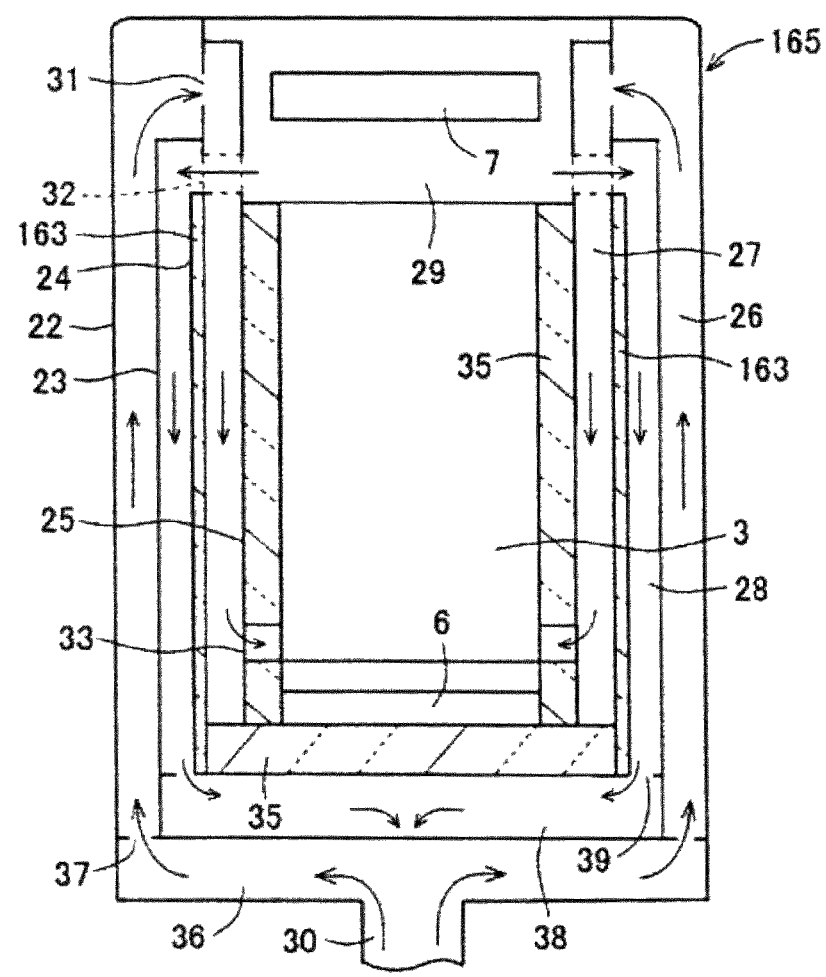
FIG. 41 is an exemplary cross-sectional view schematically illustrating the fuel cell module according to the fourteenth embodiment of the present invention.

FIG. 39 is a perspective view illustrating a fuel cell module 161, in which the cell stack device 9 is accommodated in a housing container 162, according to a fourteenth embodiment of the present invention. FIG. 40 is a cross-sectional view schematically illustrating the fuel cell module 161 shown in FIG. 39, and FIG. 41 is a cross-sectional view schematically illustrating a fuel cell module 164, in which the cell stack device 9 is accommodated in a housing container 165 and a heat-exchange suppression member 163 (described later) is provided, according to another example of the present embodiment. The fuel cell modules 161, 164 as well as the housing containers 162, 165 in the present embodiments are similar to the fuel cell module 1 and the housing container 2 in the first embodiment, and the same reference symbols are given to corresponding portions and explanations are omitted.

In the housing containers 162, 165, reaction gas supplied from the reaction-gas supply pipe 30 flows through the first flow channel 26 as well as the second flow channel 27 and is supplied into the power generating chamber 29, but the temperature of the reaction gas flowing through the second flow channel 27 becomes high as a result of heat exchange with the heat inside the power generating chamber 29. On the other hand, since exhaust gas flowing through the third flow channel 28 from the power generating chamber 29 is subjected to heat exchange with the reaction gas flowing through the first flow channel 26 and does not have a high temperature, there is a risk that the temperature may end up being lower than that of the reaction gas flowing through the second flow channel 27. In conjunction with this, due to heat exchange between the reaction gas flowing through the second flow channel 27 and the exhaust gas flowing through the third flow channel 28, the temperature of the reaction gas flowing through the second flow channel 27 may become low, and there is a risk of lowering the power generation output of the fuel cell 3.

Therefore, a heat-exchange suppression member 163 for suppressing heat exchange between the reaction gas flowing through the second flow channel 27 and the exhaust gas flowing through the third flow channel 28 is provided in the fuel cell modules 161, 164 in at least one of either between the first wall 23 and the second wall 24 or between the second wall 24 and the third wall 25 (at least one of either the second flow channel 27 or the third flow channel 28).

As a result, heat exchange between the reaction gas flowing through the second flow channel 27 and the exhaust gas flowing through the third flow channel 28 may be suppressed, and decreases in the temperature of the reaction gas flowing through the second flow channel 27 may thereby be suppressed. As a result, high-temperature reaction gas may be supplied to the fuel cell 3, thus allowing the fuel cell modules 161, 164 to be realized with high power generating efficiency.

FIG. 40 illustrates an example in which the heat-exchange suppression member 163 is provided in the second flow channel 27, and FIG. 41 illustrates an example in which the heat-exchange suppression member 163 is provided in the third flow channel 28. The heat-exchange suppression member 163 may also be arranged in both flow channels (i.e., the second flow channel 27 and the third flow channel 28). Each of the heat-exchange suppression members 163 shown in FIG. 40 and FIG. 41 are arranged by being secured onto the second wall 24.

Because the heat of reaction gas flowing through the second flow channel 27 is subjected to heat exchange with exhaust gas flowing through the third flow channel 28 via the second wall 24, by arranging the heat-exchange suppression member 163 while securing the same onto the second wall 24, heat exchange between the reaction gas flowing through the second flow channel 27 and the exhaust gas flowing through the third flow channel 28 may be effectively suppressed.

There are no particular limitations on the heat-exchange suppression member 163, which can be of any type as long as heat exchange between the reaction gas flowing through the second flow channel 27 and the exhaust gas flowing through the third flow channel 28 is suppressed, or in other words, as long as the heat transfer rate is low and unlikely to be affected by the temperature of the reaction gas flowing through the second flow channel 27, and examples that can be used include insulating material, concrete, and glass. Moreover, based on considerations of the cost and weight, etc. of the fuel cell modules 161, 164, it is preferable to use insulating material as the heat-exchange suppression member.

Here, if insulating material is used as the heat-exchange suppression member 163, a form that allows for easy arrangement in at least one of either the second flow channel 27 or the third flow channel 28 is preferred, and examples of shapes that can be used include a plate-like insulating material.

Furthermore, to effectively suppress decreases in the temperature of the reaction gas flowing through the second flow channel 27, the respective sizes of both the second flow channel 27 and the third flow channel 28 are preferably larger than the profile of the side portion along the arrangement direction of the fuel cell 3 that constitutes the cell stack 4, and the size of the heat-exchange suppression member 163 is preferably larger than the profile of the side portion along the arrangement direction of the fuel cell 3 that constitutes the cell stack 4.

That is, when using a plate-like insulating material as the heat-exchange suppression member 163, the preferable size of the heat-exchange suppression member 163 includes a width that is greater than the width in the arrangement direction of the fuel cell 3 constituting the cell stack 4 and a width that is greater than the width in the longitudinal direction of the fuel cell 3.

As a result, heat inside the power generating chamber 29 or heat generated by the power generation of the fuel cell 3 can be effectively subjected to heat exchange (heat transfer) with reaction gas flowing through the second flow channel 27, and at the same time, heat exchange between the reaction gas flowing through the second flow channel 27 and the exhaust gas flowing through the third flow channel 28 may be suppressed, thus allowing high-temperature reaction gas to be supplied to the fuel cell 3. Furthermore, decreases in the temperature of the cell stack 4 while the reaction gas is flowing through the second flow channel 27 may also be suppressed by making the size of the heat-exchange suppression member 163 larger than the profile of the side portion along the arrangement direction of the fuel cell 3 that constitutes the cell stack 4.

The heat-exchange suppression member 163 shown in FIG. 40 is arranged in the second flow channel 27 and is formed in a manner causing the upper end thereof to be positioned higher than the upper end of the fuel cell 3, and the heat-exchange suppression member 163 shown in FIG. 41 is arranged in the third channel 28 and is formed in a manner causing the lower end thereof to be positioned lower than the lower end of the fuel cell 3 while the upper end thereof is positioned higher than the upper end of the fuel cell 3. Although this is not illustrated, the heat-exchange suppression member 163 is constituted with a width greater than the width in the arrangement direction of the fuel cell 3 that constitutes the cell stack 4 and a size greater than the profile of the side portion along the arrangement direction of the fuel cell that constitutes the cell stack 4.

In order to effectively suppress decreases in the temperature of the reaction gas flowing through the second flow channel 27, the heat-exchange suppression member 163 is preferably provided in the flow channel in which the area of the second wall 24 constituting both of the flow channels is larger from among the second flow channel 27 and the third flow channel 28, and at this time, the heat-exchange suppression member 163 may also be secured onto the entire face of the second wall 24 that constitutes both of the flow channels.

As a result, decreases in the temperature of the reaction gas flowing through the second flow channel 27 may be suppressed, thus making it possible to supply high-temperature reaction gas to the fuel cell 3 and realize the fuel cell module 161 with high power generating efficiency.

Furthermore, when the heat-exchange suppression member 163 is secured onto the second wall 24, a securing member for securing the heat-exchange suppression member 163 may be provided on the second wall 24, or a securing member for securing the heat-exchange suppression member 163 onto the second wall 24 may be provided on the first wall 23 or the third wall 25.

As described above, within the housing containers 162, 165, a fuel cell module simply has to be equipped with the first flow channel 26 through which reaction gas supplied from the reaction-gas supply pipe 30 flows upward, the second flow channel 27 through which reaction gas flowing through the first flow channel 26 is supplied into the power generating chamber 29 (fuel cell), the third flow channel 28 through which exhaust gas inside the power generating chamber 29 is passed down toward the lower side, and the heat-exchange suppression member 163 in at least one of either the second flow channel 27 or the third flow channel 28, and the constitution of each of the flow channels may be set in an appropriate manner.

Fifteenth and Sixteenth Embodiment

Figure 42:
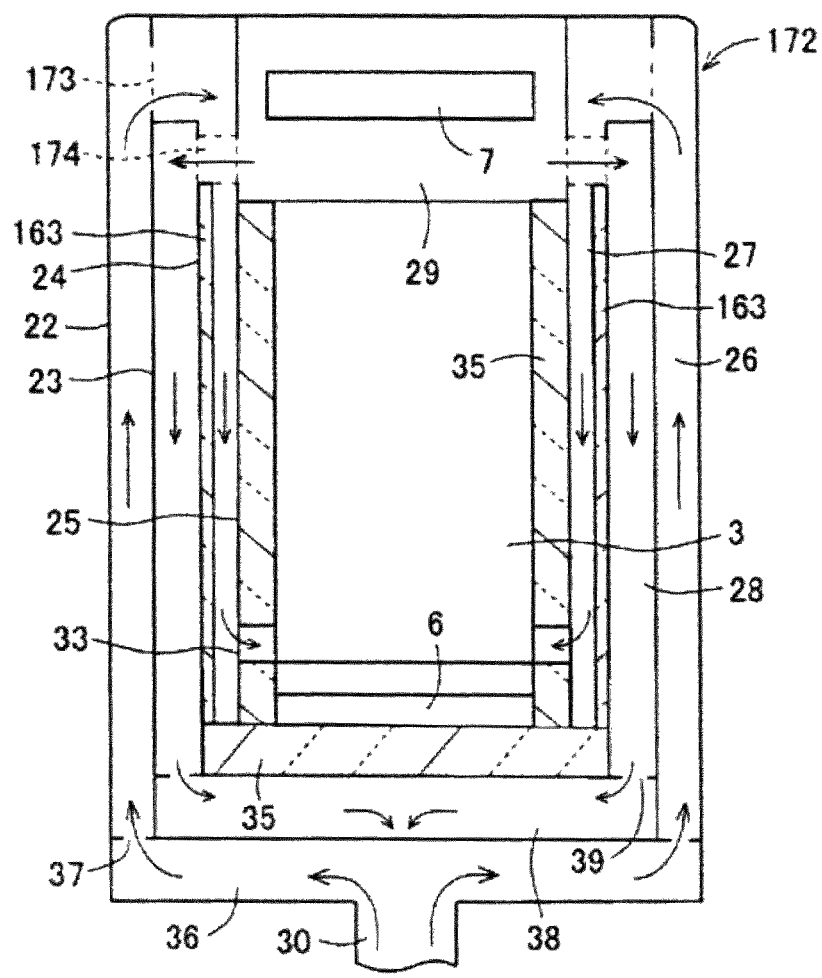
FIG. 42 is a cross-sectional view schematically illustrating the fuel cell module according to the fifteenth embodiment of the present invention.
Figure 43:
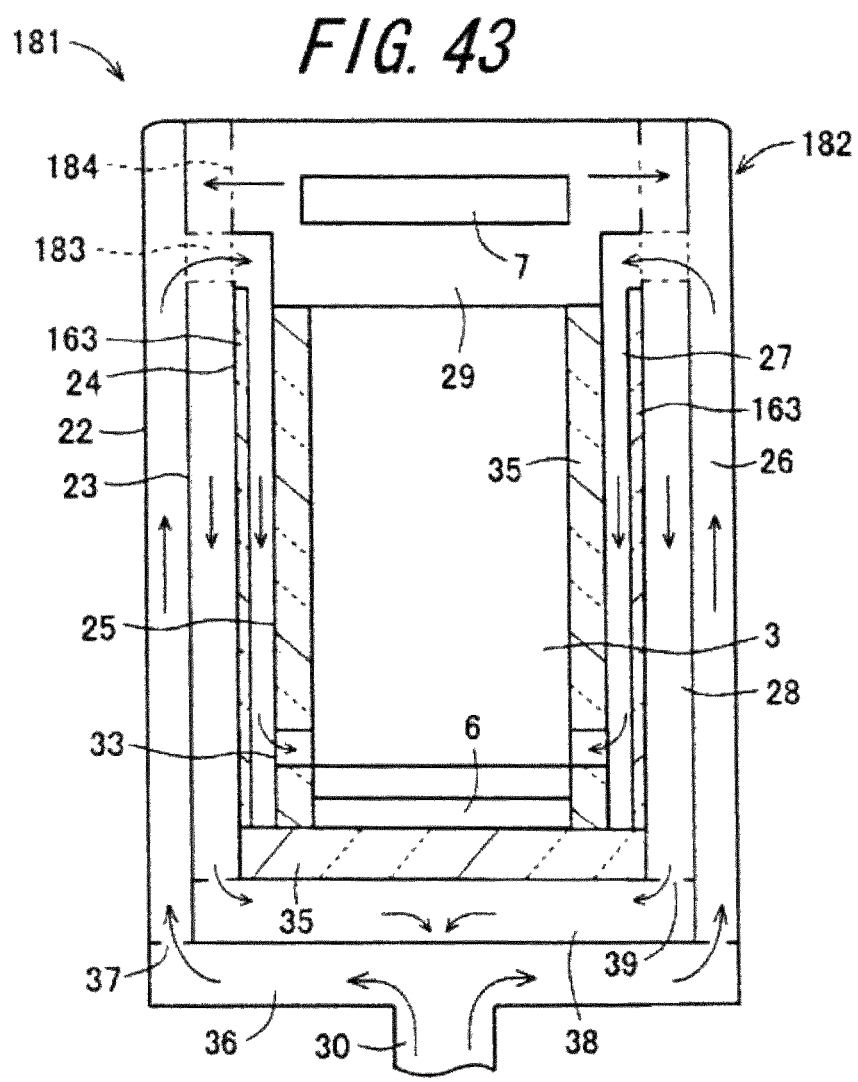
FIG. 43 is a cross-sectional view schematically illustrating the fuel cell module according to the sixteenth embodiment of the present invention.

FIG. 42 shows a fuel cell module 171, in which the cell stack device 9 is accommodated in a housing container 172, according to a fifteenth embodiment of the present invention. FIG. 43 shows a fuel cell module 181, in which the cell stack device 9 is accommodated in a housing container 182, according to a sixteenth embodiment of the present invention. In the housing container 172 shown in FIG. 42, the upper end of the first wall 23 is connected to the top wall (outer wall 22) of the housing container 172, and a reaction-gas flow port 173 for connecting the first flow channel 26 and the second flow channel 27 is provided on the first wall 23. The upper end of the second wall 24 is connected at a position lower than the reaction-gas flow port 173 of the first wall 23. Furthermore, the upper end of the third wall 25 is connected to the top wall of the housing container 172, and an exhaust-gas flow passage 174 that connects the power generating chamber 29 and the third flow channel 28 is provided between the second wall 24 and the third wall 25. Furthermore, the third wall 25 may also be connected to the first wall 23 on the side closer to the top wall of the housing container 172 (or the side higher than the reaction-gas flow port 173) from the connection part of the first wall 23 and the second wall 24. The housing container 172 shown in FIG. 42 is an example in which the heat-exchange suppression member 136 is arranged along the second flow channel 27.

Moreover, in the housing container 182 shown in FIG. 43, the upper end of the first wall 23 is connected to the top wall (outer wall 22) of the housing container 182, and the upper end of the second wall 24 is connected to the top wall (outer wall 22) of the housing container 182. An exhaust-gas flow port 184 that connects the power generating chamber 29 and the third flow channel 28 is provided between the second wall 24 and the third wall 25. A reaction-gas flow passage 183 that connects the first flow channel 26 and the second flow channel 27 is provided between the first wall 23 and the second wall 24. Moreover, the upper end of the third wall 25 is connected to the second wall 24 in the lower side of the exhaust-gas flow port 184 of the second wall 24 at a position that is equal to or higher than the upper end of the reaction-gas flow passage 183. Furthermore, the upper end of the second wall 24 may also be connected to the first wall 23 on the side closer to the top wall of the housing container 182 from the exhaust-gas flow port 184. FIG. 43 shows an example of the housing container 182 in which the heat-exchange suppression member 163 is provided in the second flow channel 27.

In addition, in the housing container 172 and the housing container 182 shown in FIG. 42 and FIG. 43, respectively, reaction gas supplied from the reaction-gas supply pipe 30 flows upward through the first flow channel 26 and flows into the fuel cell 3 after the reaction gas flowing through the first flow channel 26 subsequently flows through the second flow channel 27. The exhaust gas inside the power generating chamber 29 flows though the third flow channel and is discharged outside the housing container 172 and the housing container 182. At this time, because the heat-exchange suppression member 163 is provided in the second flow channel 27, heat exchange between the reaction gas flowing through the second flow channel 27 and the exhaust gas flowing through the third flow channel 28 may be suppressed, and decreases in the temperature of the reaction gas flowing through the second flow channel 27 may thereby be suppressed. As a result, high-temperature reaction gas may be supplied to the fuel cell 3, thus allowing a fuel cell module with high power generating efficiency to be realized.

Seventeenth Embodiment

Figure 44:
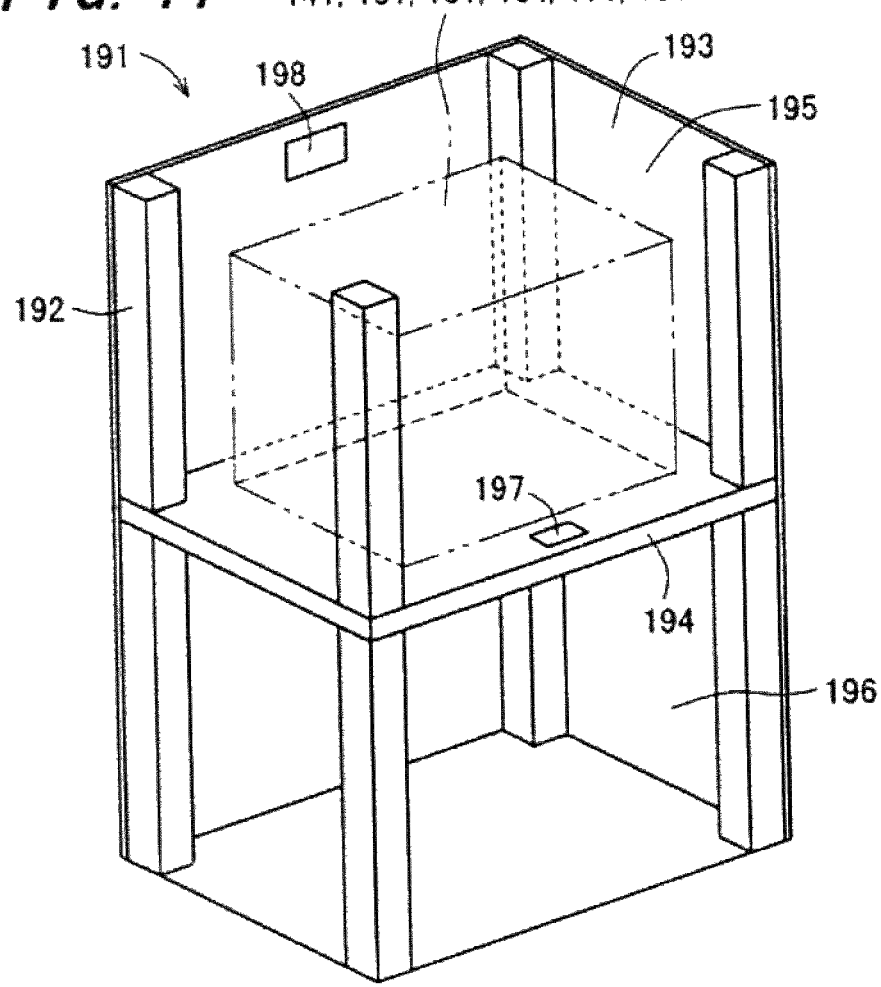
FIG. 44 is a cross-sectional view schematically illustrating the fuel cell battery device according to the seventeenth embodiment of the present invention.

FIG. 44 is a perspective view illustrating a fuel cell device according to a seventeenth embodiment. FIG. 44 is shown by omitting part of the constitution.

For the fuel cell device 191 shown in FIG. 44, the inside of an exterior case composed of columns 192 and exterior plates 193 is divided vertically by a partitioning plate 194, and the upper side thereof is constituted as a module-housing chamber 195 for accommodating the fuel cell module described above while the lower side thereof is constituted as an auxiliary-machine housing chamber 196 for accommodating an auxiliary machine to operate the fuel cell module. The auxiliary machine to be accommodated in the auxiliary-machine housing chamber 196 has been omitted in FIG. 44.

Furthermore, an air flow port 197 through which air in the auxiliary-machine housing chamber 196 flows into the module-housing chamber 195 is provided at the partitioning plate 194, and an exhaust port 198 for discharging air inside the module-housing chamber 195 is provided at a portion of the exterior plate 193 that constitutes the module-housing chamber 195.

In this type of fuel cell device 191, as described above, a constitution in which a fuel cell module capable of enhancing power generating efficiency is accommodated in the module-housing chamber 195 to realize the fuel cell device 191 with enhanced power generating efficiency.

The present invention has been described in detail, but the present invention is not limited to the above embodiments, various modifications, improvements, and the like. are possible within the scope of the present invention.

For example, between the second wall 24 and the third wall 25 located near the reaction-gas supply port 33 in the second flow channel, it is possible to provide a plate-like reaction-gas flow-direction adjusting member through which reaction gas flowing through the second flow channel efficiently flows into the power generating chamber 29. As a result, the reaction gas flowing through the second flow channel efficiently flows into the power generating chamber 29, thereby enhancing the power generating efficiency of the fuel cell 3.

In the above embodiments, cases in which oxygen-containing gas (air) flows through each flow channel in a housing container as reaction gas have been given as examples, but gas containing hydrogen (fuel gas), for example, may flow through each flow channel in the housing container as reaction gas. In this case, air supplied to the manifold 6 simply has to be warmed by a separate constitution and the reformer 7 simply has to be arranged outside the housing container.

In the above Embodiments 8 and 9, for example, it is also possible to provide an outward channel 97 and a return channel 98 so that reaction gas flowing through the first flow channel 26 returns multiple times above the power generating chamber 29. In addition, in this case, efficient heat exchange with the reaction gas supplied to the fuel cell 3 and the heat above the power generating chamber 29 is possible, thus allowing the power generating efficiency of the fuel cell 3 (or fuel cell modules 91, 101) to be enhanced.

The above tenth embodiment shows as an example in which the upper first flow channel 114 is arranged along the top wall 22 of the housing container 112 and the upper second flow channel 115 is provided in the lower side thereof, but it is also possible to reverse the arrangement of the upper first flow channel 114 and the upper second flow channel 115.

In the fuel cell module in the above eleventh through thirteenth embodiments, the housing container simply has to be internally equipped with the first flow channel 26 through which reaction gas supplied from the reaction-gas supply pipe 30 flows upward, the second flow channel 27 for supplying the reaction gas flowing through the first flow channel 26 to the power generating chamber 29 (fuel cell 3), and the third flow channel 28 through which exhaust gas inside the power generating chamber 29 flows downward, with the heat-exchange suppression part 134 in at least one of either between the first wall 23 and the second wall 24 or between the second wall 24 and the third wall 25 (the second flow channel 27 and the third flow channel 28).

Therefore, if the temperature of the reaction gas supplied to the fuel cell 3 is increased further, the constitution of the housing containers 132, 138. 142 and 152 may be applied to embodiments other than those of the above examples.

For example, the housing container may be constituted so that the reaction gas flowing upward through the first flow channel 26 flows to the center part side of the power generating chamber 29 along the top wall of the housing chamber before returning and flowing into the second flow channel. That is, application to the eighth and ninth embodiments is possible.

In this type of constitution, because it is possible to use the heat in the upper side, where the temperature becomes particularly high inside the power generating chamber 29, the temperature of the reaction gas supplied to the fuel cell 3 may be further increased, and at the same time, by providing the heat-exchange suppression part 134 between the second flow channel 27 and the third flow channel 28, heat exchange between the reaction gas flowing through the second flow channel 27 and the exhaust gas flowing through the third channel 28 may be suppressed, thus allowing high-temperature reaction gas to be supplied to the fuel cell 3. As a result, a fuel cell module with high power generating efficiency may be realized.

In another example, the housing container may be constituted so that the reaction gas flowing upward through the first flow channel 26 located on the side face on one side of the cell stack 4 is supplied to the fuel cell 3 after flowing along the top wall of the housing container and subsequently flows into the second flow channel 27 located on the side face on the other side of the cell stack 4. That is, application to the tenth embodiment is possible.

In this type of constitution, because heat in the upper side, where the temperature becomes particularly high inside the power generating chamber 29, may be utilized, and because the reaction gas flowing through the first flow channel 26 located on the side face on one side of the cell stack 4 flows into the second flow channel 27 located on the side face on the other side, the temperature of the reaction gas supplied from the side faces on both sides of the fuel cell 3 can be made more uniform, thus making it possible to realize a fuel cell module with high power generating efficiency.

In the fuel cell module in the above fourteenth through sixteenth embodiments, the housing container simply has to be internally equipped with the first flow channel 26 through which reaction gas supplied from the reaction-gas supply pipe 30 flows upward, the second flow channel 27 for supplying the reaction gas flowing through the first flow channel 26 to the power generating chamber 29 (fuel cell 3), and the third flow channel 28 through which exhaust gas inside the power generating chamber 29 is passed down toward the lower side, with the heat-exchange suppression part 134 in at least either one of between the first wall 23 and the second wall 24 or between the second wall 24 and the third wall 25 (the second flow channel 27 and the third flow channel 28).

Therefore, when the temperature of the reaction gas supplied to the fuel cell 3 is increased, the constitution of the housing container may be applied to embodiments other than those of the above examples.

For example, the housing container may be constituted so that the reaction gas flowing upward through the first flow channel 26 flows to the center part side of the power generating chamber 29 along the top wall of the housing container before flowing into the second flow channel 27. That is, application to the eighth and ninth embodiments is possible.

In this type of constitution, because heat on the upper side, where the temperature becomes particularly high inside the power generating chamber 29, may be utilized, the temperature of the reaction gas supplied to the fuel cell 3 can be higher, and in addition, by providing the heat-exchange suppression member 163 in at least one of either between the first wall 23 and the second wall 24 or between the second wall 24 and the third wall 25 (the second flow channel 27 and the third flow channel 28), heat exchange between the reaction gas flowing through the second flow channel 27 and the exhaust gas flowing through the third channel 28 may be suppressed, thus allowing high-temperature reaction gas to be supplied. As a result, a fuel cell module with high power generating efficiency may be realized.

In another example, the housing container may be constituted so that the reaction gas flowing upward through the first flow channel 26 located on the side face on one side of the cell stack 4 is supplied to the fuel cell 3 after flowing along the top wall of the housing containers 162, 165, 172, and 182 and subsequently flows into the second flow channel 27 located on the side face on the other side of the cell stack 4. That is, application to the tenth embodiment is possible.

In this type of constitution, since the heat in the upper side, where the temperature becomes particularly high inside the power generating chamber 29, may be utilized and because the reaction gas flowing through the first flow channel 26 located on the side face on one side of the cell stack 4 flows into the second flow channel 27 located on the side face on the other side, the temperature of the reaction gas supplied from the side faces on both sides of the fuel cell 3 can be made more uniform, thus making it possible to realize a fuel cell module with high power generating efficiency.

Moreover, the above sixth through sixteenth embodiments show examples in which a single column of the cell stack 4 is arranged inside the power generating chamber 29, but two of the cell stacks 4 may also be arranged inside the power generating chamber 29 in a parallel manner for the fuel cell module. In this case, because reaction gas with a higher temperature is supplied from the side face (supply port 33) on one side of each of the cell stacks 4, even if two of the cell stacks 4 are arranged in a parallel manner, efficient power generation of the fuel cell is possible.

The present invention may be implemented in various other modes without deviating from the spirit or the major characteristics thereof. Therefore, the previously described embodiments are only examples, and the scope of the present invention is indicated in the scope of patent claims and is not restricted by the body of the specification. Furthermore, all modifications or changes within the scope of patent claims remain within the scope of the present invention.

The invention claimed is:

1. A fuel cell module comprising:
a housing container,
a power generating chamber in the housing container;
a cell stack in the power generating chamber
   comprising a plurality of column-shaped fuel cells comprising one or more internal gas flow channels therein, and arranged in an upright state and electrically connected,
wherein, between a side portion of the fuel cells that constitute the cell stack along the arrangement direction of the fuel cells and an outer wall of the housing container facing the side portion, the housing container comprises:
a first flow channel between the outer wall and a first wall located inside of the outer wall, operable to guide a reaction gas supplied from the lower side of the housing container to flow to the upper side;
a second flow channel between a second wall located inside the first wall and a third wall located inside the second wall, operable to guide the reaction gas that has passed through the first flow channel and flowed into the upper side to flow to the lower side so as to be supplied to the power generating chamber; and
a third flow channel between the first wall and the second wall operable to guide an exhaust gas in the power generating chamber to flow from the upper side to the lower side, the third flow channel formed between the first flow channel and the second flow channel, wherein the third flow channel and the second flow channel are separated only by the second wall.

2. The fuel cell module according to claim 1, wherein
the upper end of the first wall is connected to the second wall,
the upper end of the second wall is connected to a top wall of the housing container,
the upper end of the third wall is connected to the top wall of the housing container or the second wall on the side closer to the top wall of the housing container from a connection part of the first wall and the second wall, and
the fuel cell module comprises:
   a reaction-gas flow port on the second wall, connecting the first flow channel and the second flow channel;
   an exhaust-gas flow passage between the second wall and the third wall, connecting the power generating chamber and the third flow channel; and
   a reaction-gas supply port on a side of the lower end portion of the third wall, operable to supply reaction gas into the power generating chamber.

3. The fuel cell module according to claim 1, wherein
the upper end of the first wall is connected to a top wall of the housing container,
the upper end of the second wall is connected to the first wall,
the upper end of the third wall is connected to the top wall of the housing container or the first wall on the side closer to the top wall of the housing container from a connection part of the first wall and the second wall, and
the fuel cell module comprises:
   a reaction-gas flow port on the first wall, connecting the first flow channel and the second flow channel;
   a reaction-gas supply port on a side of the lower end portion of the third wall, operable to supply reaction gas into the power generating chamber; and
   an exhaust-gas flow passage between the second wall and the third wall, connecting the power generating chamber and the third flow channel.

4. The fuel module according to claim 3,
wherein a plurality of the reaction gas flow ports are provided, and
wherein a plurality of the exhaust gas flow passages are provided.

5. The fuel cell module according to claim 1, wherein
the upper end of the first wall is connected to the top wall of the housing container,
the upper end of the second wall is connected to the first wall or a top wall of the housing container,
the upper end of the third wall is connected to the second wall, and
the fuel cell module comprises:
   a reaction-gas flow passage between the first wall and the second wall, connecting the first flow channel to the second flow channel;
   an exhaust-gas flow port on a side closer to the top wall of the housing container from a connection part of the second wall and the third wall for connecting the power generating chamber and the third flow channel; and
   a reaction-gas supply port on a side of a lower end portion of the third wall operable to supply reaction gas into the power generating chamber.

6. The fuel module according to claim 5,
wherein a plurality of the reaction gas flow passages are provided, and
wherein a plurality of the exhaust gas flow ports are provided.

7. The fuel cell module according to claim 1, wherein the housing container comprises a reaction gas supply unit connected to the reaction gas supply pipe on a bottom surface thereof, and the reaction gas supply unit is connected to the first flow channel.

8. The fuel cell module according to claim 7, wherein the reaction gas supply unit comprises:
an exhaust-gas collecting unit thereon which is operable to collect exhaust gases that have passed through the third flow channel above the reaction gas supply unit; and
a exhaust gas pipe operable to discharge the exhaust gases that passed through the exhaust-gas collecting unit to outside of the housing container, and connected to the exhaust-gas collecting unit.

9. The fuel cell module according to claim 1, wherein
a reformer for supplying fuel gas to the fuel cells is connected to the inner face of the top wall of the housing container, and
a raw-fuel supply pipe for supplying raw fuel to the reformer is connected to the reformer.

10. The fuel cell module according to claim 1,
the housing container further comprises:
a fourth flow channel located between the upper wall of the housing container and the upper wall of the power generating chamber inside the upper wall of the housing container, and operable to supply the reaction gas flowing in the first flow channel into the second flow channel after flowing along the top wall of the housing container; and
an exhaust-gas collecting chamber above the power generating chamber, through which exhaust gas in the power generating chamber flows into the third flow channel after being collected.

11. The fuel cell module according to claim 10, further comprising a partition member through which:
reaction gas that has passed through the first flow channel located on one side along the arrangement direction of the fuel cells flows into the second flow channel located on one side along the arrangement direction of the fuel cells; and
reaction gas that has passed through the first flow channel located on the other side along the arrangement direction of the fuel cells flows into the second flow channel located on the other side along the arrangement direction of the fuel cells.

12. The fuel cell module according to claim 10, further comprising a fifth flow channel above the exhaust gas-collecting chamber, wherein reaction gas that has passed through the fourth flow channel flows through the fifth flow channel into the second flow channel after being collected.

13. The fuel cell module according to claim 1, the housing container further comprising a fourth flow channel:
located between the upper wall of the housing container and the upper wall of the power generating chamber inside the upper wall of the housing container, comprising:
an outward channel through which reaction gas that has passed through the first flow channel flows into a center part in a direction perpendicular to the arrangement direction of the fuel cells; and
a return channel through which the reaction gas flows into the second flow channel after returning at an end of the outward channel.

14. The fuel cell module according to claim 13,
wherein at least one of either the outward channel or the return channel is arranged along the top wall that constitutes the housing container.

15. The fuel cell module according to claim 14, wherein the return channel is arranged lower than the outward channel.

16. The fuel cell module according to claim 1,
wherein the housing container further comprises
a fourth flow channel through which reaction gas that has passed through the first flow channel located at one side along the arrangement direction of the fuel cells flows into the second flow channel located at the other side along the arrangement direction of the fuel cells after flowing in a direction perpendicular to the arrangement direction of the fuel cells, wherein the fourth flow channel is located between the upper wall of the housing container and the upper wall of the power generating chamber inside the upper wall of the housing container.

17. The fuel cell module according to claim 16,
wherein a fourth flow channel comprises:
an upper first flow channel through which reaction gas that has passed through the first flow channel located at one side along the arrangement direction of the fuel cells flows into the center part of the housing container in a direction perpendicular to the arrangement direction of the fuel cells; and
an upper second flow channel through which the reaction gas that has passed through the upper first flow channel flows into the second flow channel located at the other side along the arrangement direction of the fuel cells, and
wherein the upper first flow channel or the upper second flow channel is arranged along the top wall that constitutes the housing container.

18. The fuel cell module according to claim 1, wherein two of the cell stacks are arranged in a parallel manner in the power generating chamber.

19. A fuel cell device, comprising:
an exterior case;
the fuel cell module according to claim 1 in the exterior case; and
an auxiliary device for operating the fuel cell module.

20. The fuel cell module according to claim 1, wherein the housing container further comprises a heat-exchange suppression member between the first wall and the second wall or between the second wall and the third wall, wherein the heat-exchange suppression member is operable to suppress heat exchange between reaction gas flowing in the second flow channel and exhaust gas flowing in the third flow channel.

21. The fuel cell module according to claim 20, wherein
the heat-exchange suppression member is attached to the second wall.

22. The fuel cell module according to claim 21, wherein
the second flow channel and the third flow channel are each larger than the profile of the side portion along the arrangement direction of the fuel cells that constitute the cell stack, and
the heat-exchange suppression member is a sheet-like insulating material larger than the profile of the side portion along the arrangement direction of the fuel cells that constitute the cell stack.

23. The fuel cell module according to claim 20, wherein the housing container further comprises a fourth wall between the first wall and the second wall, and
the space between the second wall and the fourth wall serve as the heat-exchange suppression member.

24. The fuel cell module according to claim 23, wherein
the second flow channel and the third flow channel are each larger than the profile of the side portion along the arrangement direction of the fuel cells that constitute the cell stack, and
the heat-exchange suppression member is larger than the profile of the side portion along the arrangement direction of the fuel cells that constitute the cell stack.

25. The fuel module according to claim 1, further comprising an insulating material located between the cell stack and the third wall, the insulating material comprising a first side surface and a second side surface, wherein
the first side surface directly contacts the cell stack, and
the second side surface directly contacts the third wall.

26. A fuel cell module comprising:
a housing container,
a power generating chamber in the housing container;
a cell stack in the power generating chamber
comprising a plurality of column-shaped fuel cells comprising one or more internal gas flow channels therein, and arranged in an upright state and electrically connected,
wherein, between a side portion of the fuel cells that constitute the cell stack along the arrangement direction of the fuel cells and an outer wall of the housing container facing the side portion, the housing container comprises:
a first flow channel between the outer wall and a first wall located inside of the outer wall, operable to guide a reaction gas supplied from the lower side of the housing container to flow to the upper side;
a second flow channel between a second wall located inside the first wall and a third wall located inside the second wall, operable to guide the reaction gas that has passed through the first flow channel and flowed into the upper side to flow to the lower side so as to be supplied to the power generating chamber;
a third flow channel between the first wall and the second wall operable to guide an exhaust gas in the power generating chamber to flow from the upper side to the lower side, the third flow channel formed between the first flow channel and the second flow channel; and
a fourth wall between the second wall and the third wall, or between the first wall and the second wall,
wherein the fuel cell module further comprises an insulating material comprising a first side surface and a second side surface, and the first side surface directly contacts the second wall, and the second side surface directly contacts the fourth wall.

* * * * *